(12) United States Patent
Shimomura et al.

(10) Patent No.: US 7,351,492 B2
(45) Date of Patent: Apr. 1, 2008

(54) SOLID OXIDE TYPE FUEL CELL-USE ELECTRODE SUPPORT SUBSTRATE AND PRODUCTION METHOD THEREFOR

(75) Inventors: Masatoshi Shimomura, Himeji (JP); Teruhisa Nagashima, Himeji (JP); Kazuo Hata, Suita (JP)

(73) Assignee: Nippon Shokubai Co., Ltd., Osaka (JP)

( * ) Notice: Subject to any disclaimer, the term of this patent is extended or adjusted under 35 U.S.C. 154(b) by 174 days.

(21) Appl. No.: 10/515,227

(22) PCT Filed: May 21, 2003

(86) PCT No.: PCT/JP03/06318

§ 371 (c)(1),
(2), (4) Date: Feb. 1, 2005

(87) PCT Pub. No.: WO03/098724

PCT Pub. Date: Nov. 27, 2003

(65) Prior Publication Data

US 2005/0142431 A1  Jun. 30, 2005

(30) Foreign Application Priority Data

May 22, 2002 (JP) ............................. 2002-147601
May 22, 2002 (JP) ............................. 2002-147602

(51) Int. Cl.
H01M 8/10 (2006.01)
H01M 4/00 (2006.01)

(52) U.S. Cl. .......................................... 429/44; 429/40
(58) Field of Classification Search ................... 429/30, 429/33, 40, 44
See application file for complete search history.

(56) References Cited

U.S. PATENT DOCUMENTS 5,766,788 A  6/1998 Inoue et al.
6,344,426 B1  2/2002 Hata et al.
6,887,361 B1 *  5/2005 Visco et al. ................ 204/491

FOREIGN PATENT DOCUMENTS

| EP | 1026134 | 8/2000 |
|----|---------|--------|
| EP | 1063212 | 12/2000 |
| EP | 1063212 A1 * | 12/2000 |
| EP | 1081778 | 3/2001 |
| EP | 1 246 288 | 10/2002 |

(Continued)

Primary Examiner—Patrick Joseph Ryan
Assistant Examiner—Ben Lewis
(74) Attorney, Agent, or Firm—Wenderoth, Lind & Ponack, L.L.P.

(57) ABSTRACT

Disclosed is an electrode support substrate for a fuel cell which is even, gives a small fluctuation in gas permeability, and is capable of carrying out printing of an anodic electrode with high adhesiveness, and which comprises a ceramic sheet having a porosity of 20 to 50%, a thickness of 0.2 to 3 mm and a surface area of 50 cm$^2$ or more wherein the variation coefficient of measured values of the gas permeable amounts of areas measured by the method according to JIS K 6400 ranges from 5 to 20% and further the surface roughness measured with a laser optical manner three-dimensional shape measuring device may be 1.0 to 40 µm as the maximum roughness depth (Rmax) thereof.

12 Claims, 6 Drawing Sheets

FOREIGN PATENT DOCUMENTS

| | | |
|---|---|---|
| JP | 6-290786 | 10/1994 |
| JP | 7-022032 | 1/1995 |
| JP | 11-343123 | 12/1999 |
| JP | 2000-053720 | 2/2000 |
| JP | 2000-281438 | 10/2000 |
| JP | 2001-081263 | 3/2001 |
| JP | 2001-114577 | 4/2001 |
| JP | 2001-247373 | 9/2001 |
| JP | 2002-15757 | 1/2002 |

* cited by examiner

US 7,351,492 B2

SOLID OXIDE TYPE FUEL CELL-USE ELECTRODE SUPPORT SUBSTRATE AND PRODUCTION METHOD THEREFOR

TECHNICAL FIELD

The present invention relates to an electrode support substrate for a solid oxide type fuel cell. In particular, the present invention relates to an electrode support substrate for a fuel cell, which is even in the size and the distribution situation of pores all over the surface of the substrate, which is even and good in the permeability/diffusibility of gas and which makes it possible that when an electrode or an electrolyte is formed on a single face of the electrode support substrate by screen printing or the like, the printed electrode or electrolyte is made excellent in evenness and adhesion, and to a useful process for producing the same.

In this specification, an electrode support substrate includes an electrode-forming substrate having, on a single face thereof, a formed anodic electrode layer or a solid electrolyte film. The substrate has a function as an anodic electrode in itself and is a support substrate for constituting a cell by forming a solid electrolyte layer and a cathodic electrode layer successively on the support substrate itself. In the present invention, these are referred to as electrode support substrates.

BACKGROUND ART

In recent years, attention has been paid to fuel cells as clean energy sources. The use purposes thereof are mainly power generation for home use, power generation for business, power generation for automobiles, and others, and researches for improving the cells and making the cells practicable have been rapidly advanced.

A typical structure of solid oxide type fuel cells is basically a stack obtained by stacking a large number of cells wherein an anodic electrode is formed on one face side of a planar solid electrolyte self-supporting film and a cathodic electrode is formed on the other face side. In order to make the power generation performance of the fuel cells high, it is effective to make the solid electrolyte self-supporting film dense and thin. This is based on the following reason. The solid electrolyte self-supporting film needs to have denseness for blocking the mixing of a fuel gas which is a power generation source with air surely, and an excellent ionic conductivity capable of suppressing electric conductance loss as much as possible. For this purpose, the film is required to be as thin and dense as possible. Moreover, a large stacking-load is imposed on the solid electrolyte self-supporting film since a fuel cell has a structure wherein a cell having an anodic electrode, a solid electrolyte self-supporting film and a cathodic electrode and a separator for separating and circulating a fuel gas and air are alternately stacked many times. Additionally, the operation temperature thereof is about 700 to 1000° C.; thus, the fuel cells receive considerable thermal stress. Accordingly, the fuel cells are required to have high-level strength and thermal stress resistance.

From the viewpoint of such required properties, a ceramic sheet made mainly of zirconia is mainly used as the material of the solid electrolyte self-supporting film for a solid oxide type fuel cell. A cell, wherein anodic and cathodic electrodes are formed on both faces of the sheet by screen printing or the like, is used.

The present inventors have been advancing research on such planar solid electrolyte self-supporting films for solid oxide type fuel cells for some time, and the research has been advanced so as to aim to make the thickness as small as possible for the purpose of decreasing ionic conductance loss while keeping physical properties and shape properties resisting stacking-load or thermal stress (preventing cracks based on local stress by decreasing undulations, projections, burrs and others) and, further, so as to aim to make the surface roughness appropriate for the purpose of heightening evenness and adhesion of the printed electrode. Previously, the present inventors suggested techniques disclosed in JP-A 2000-281438, JP-A 2001-89252, JP-A 2001-10866 and others.

These techniques made it possible that the solid electrolyte self-supporting film is largely thin and dense, and further the strength which resists stacking-load generated when cells are stacked, the thermal stress resistance, together with the adhesion and evenness of printed electrodes, are largely improved by improving the shape property, that is, decreasing undulations, projections, burrs and others.

Subsequently, the present inventors have been advancing research in order to improve the performance of fuel cells. This time, research has been made to aim to modify the property of electrode support substrates for support film type cells instead of the modification of the property of ceramic sheets used as solid electrolyte self-supporting films. This is based on the following reason. Ceramic solid electrolyte self-supporting films are more easily cracked by stacking-load as the films are made thinner; therefore, there is naturally generated a limitation in making the films thin and there is generated a limitation in decreasing in the ionic conductance loss.

In order to obtain cells having structure strength suitable for practical use in the case that thin solid electrolyte films are used therein, electrode support substrates are jointed, as supporting members for the cells, in between the cells or their electrodes are caused to have a sufficient thickness. The substrates have electrical conductivity for electric conduction. Furthermore, the substrates are made of porous ceramic material through which a fuel gas that becomes a power generation source, air, or exhaust gas (carbon dioxide, water vapor and others) generated by burning these gases can permeate and diffuse, which is different from the above-mentioned solid electrolyte self-supporting films.

In recent years, the following method has also been investigated. A method of forming an anodic electrode on a porous electrode support substrate by screen printing, forming a solid electrolyte film thereon by coating or the like, and further forming a cathodic electrode thereon by screen printing or the like to produce a cell, thereby making the solid electrolyte film still thinner so as to decrease electric conductance loss still more.

The most important theme when such a method is realized is that a cell has even and excellent gas permeability/diffusibility throughout its electrode support substrate. This is because this support substrate must be a porous substrate having pores sufficient for allowing a fuel gas and others to permeate and diffuse through the substrate. Further, the substrate is desired to have an even distribution state of the pores in such a manner that the gas can permeate and diffuse evenly through the whole of the substrate.

Another property desired for the electrode support substrate is that a superior printing adaptability is given to the surface thereof so that an electrode wherein the number of defects is as small as possible can be printed. As described above, the electrode support substrate is required to have an appropriate electrical conductivity. Further, the substrate must be a porous substrate having pores sufficient for allowing a fuel gas and others to permeate and diffuse through the substrate. Thus, numerous openings are present in the surface thereof. Therefore, in order to make superior electrode-printing possible in spite of the presence of such openings, it is indispensable to clarify surface properties peculiar to the porous electrode support substrate since the surface properties prescribed about the above-mentioned dense solid electrolyte film cannot be applied, as they are, to the porous electrode support substrate.

Still another property desired for the electrode support substrate is that the shape property of the support substrate itself is improved so that burrs, projections, undulations and others, which become stress-concentrated spots when they receive stacking-load or thermal shock, are made as small as possible. This is based on the following reason. As described above, the electrode support substrate is required to have an appropriate electrical conductivity. Further, the substrate must be a porous substrate having pores sufficient for allowing a fuel gas and others to permeate and diffuse through the substrate; thus, numerous openings are present in the surface thereof. Therefore, in order to restrain the support substrate, even admitting that the substrate is such a porous sheet, from being cracked or damaged by local stress concentration caused when it receives stacking-load, it is necessary to restrain the generation of burrs, which are formed at its internal and external circumferential edges at the time of punching, and projections or undulations, which may be formed inside the substrate, as much as possible. Furthermore, the electrode support substrate which is intended in the present invention must be a porous body through which a gas can permeate and diffuse. Therefore, the shape property effective for the printability of a dense sheet, such as a solid electrolyte film, and effective for the prevention of stress concentration thereon cannot be applied, as it is, to the electrode support substrate.

The present invention has been made, paying attention to a situation as described above. An object thereof is to provide an electrode support substrate to which electrode or a solid electrolyte film may be applied by screen printing. The substrate has the following characteristics. The entire surface of the substrate is stable against a fuel gas and others; the substrate has superior gas permeability/diffusibility. The substrate is able to form a printed electrode and a solid electrolyte film that are even and closely adhesive. The substrate has such a shape property that even if a plurality of the substrates are laminated into a cell stack and each of the substrates receives a large stacking-load, the substrate is not easily cracked or damaged by local stress concentration.

DISCLOSURE OF THE INVENTION

The subject matter of the electrode support substrate of the present invention for a fuel cell, which has solved the above-mentioned problems, is that the substrate comprises a ceramic sheet having a porosity of 20 to 50%, a thickness of 0.2 to 3 mm and a surface area of 50 cm² or more, and the variation coefficient of measured values of the gas permeable amounts of any area of 4 cm² selected optionally from the whole of the surface area of substrate, the values being measured by the method according to JIS K 6400, is from 5 to 20%.

The electrode support substrate of the present invention for a fuel cell preferably satisfies the following as a requirement for obtaining superior adhesion and evenness when an anodic electrode and so on are printed and formed on the surface of substrate, as well as the above-mentioned requirement: the surface roughness measured with a laser optical manner three-dimensional shape measuring device is 1.0 to 40 μm as the maximum roughness depth (Rmax: German Standard "DIN 4768") thereof.

Furthermore, the electrode support substrate of the present invention for a solid oxide type fuel cell is used in a multi-layered and laminated state, as described above; therefore, in order to suppress cracking or breaking based on stacking-load as much as possible when the substrate is used, it is desired that height of burrs measured with the laser optical manner three-dimensional shape measuring device is ½ or less of the thickness of the sheet. Further, it is desired that largest height(s) of undulations and/or projections measured with the same laser optical manner three-dimensional shape measuring device is/are ⅓ or less of the thickness of the sheet.

The producing process of the present invention is placed as a producing process making it possible to obtain surely an electrode support substrate for a fuel cell, in particular, an electrode support substrate for a fuel cell which satisfies the above-mentioned properties. Above process has a feature in: using, as a slurry for producing a green sheet which becomes a ceramic precursor, a slurry which comprises an conductive component powder, an skeleton component powder, a pore-forming agent powder, and a binder, defoamed under reduced pressure after milling to adjust the viscosity thereof to 40 to 100 poise (25° C.), and kept at room temperature while rotating stirring fans therein at a rotating speed of 5 to 30 rpm for 20 to 50 hours; fashioning the slurry into a sheet by a doctor blade method to obtain a green sheet; cutting the green sheet into a given shape; and then firing the green sheet having the given shape.

When the producing process is carried out, it is desired to use, as the slurry for producing the green sheet, a slurry wherein its particle size distribution has a peak in each of ranges of 0.2 to 2 μm and 3 to 50 μm and the content ratio by mass of fine particles in the range of 0.2 to 2 μm to coarse particles in the range of 3 to 50 μm is in a range of 20/80 to 90/10. Further, it is preferred to use a slurry containing 5 to 30 parts by mass of the binder and 2 to 40 parts by mass of the pore-forming agent powder with respect to 100 parts by mass of the total of the conductive component powder and the skeleton component powder.

In order to obtain the electrode support substrate satisfying the above-mentioned preferred height of burr and preferred height of undulation and/or projection, which is intended in the present invention, it is desired that when the green sheet is punched into a shape used as product, a punching blade having a waver-form blade edge is used. It is more preferred to use the punching blade which the angle $(\alpha_1)$, $(\alpha_2)$, $(\theta_1)$ and $(\theta_2)$ thereof satisfy the following relationship:

$$\alpha_1 = 30 \text{ to } 120°, \ 20° \leq \alpha_2 = \theta_1 + \theta_2 \leq 70°, \text{ and } \theta_1 \leq \theta_2,$$

the angle $(\alpha_1)$ meaning of angle being viewed from the side face of the wave-form blade, the angle $(\alpha_2)$ meaning of blade edge angle of the cross section of the blade, the angle $(\theta_1)$ meaning of angle made between the surface thereof on the side of the sheet becoming a product and a center line (x) passing through the blade edge, the angle $(\theta_2)$ meaning of angle made between the surface thereof on the side of the rest of the sheet and the center line (x) passing through the blade edge. According to this, height of undulations and/or projections and/or burrs can be favorably suppressed into as low a value as possible.

BRIEF DESCRIPTION OF THE INVENTION

Figure 3:
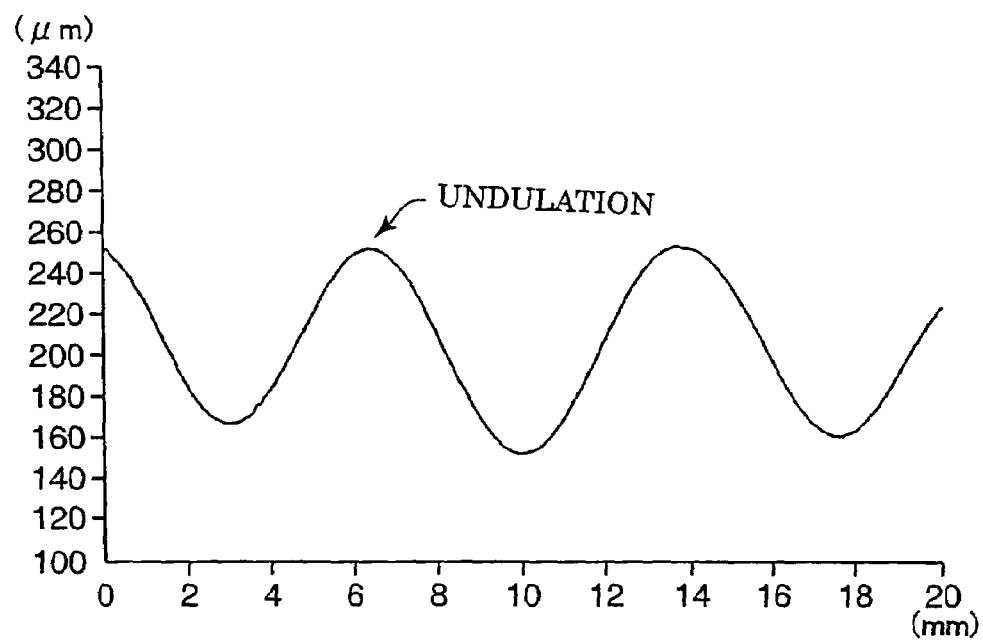
Figure 4:
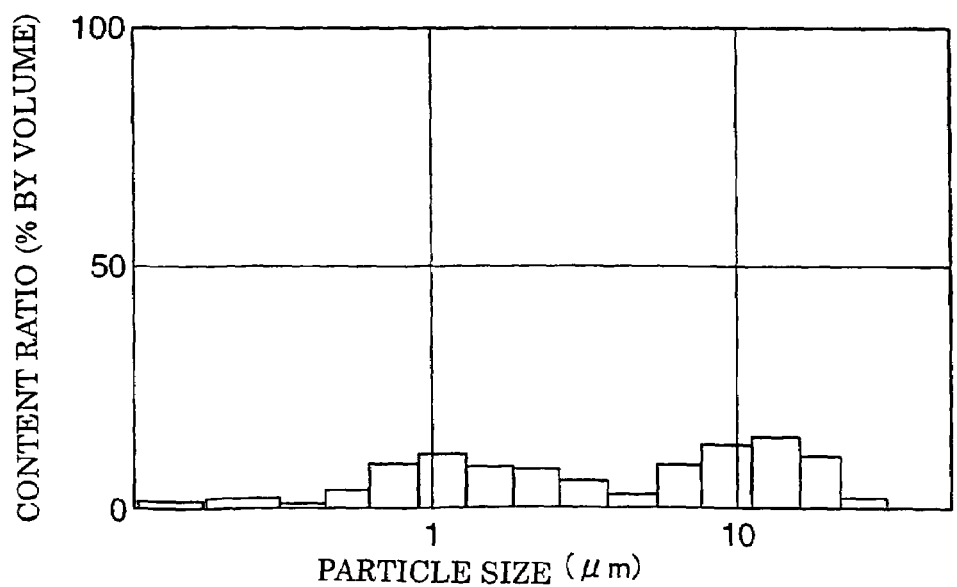

FIG. 3 is an explanatory enlarged view illustrating a projection which may be generated in the surface of an electrode substrate, which is measured with a laser optical manner three-dimensional shape measuring device; and FIG. 4 is an explanatory view illustrating an undulation which may be generated in the whole of an electrode substrate, which is measured with a laser optical manner three-dimensional shape measuring device.

Figure 5:
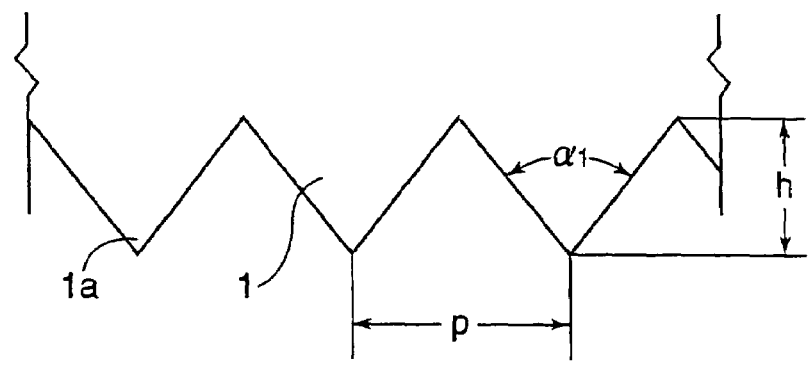
Figure 6:
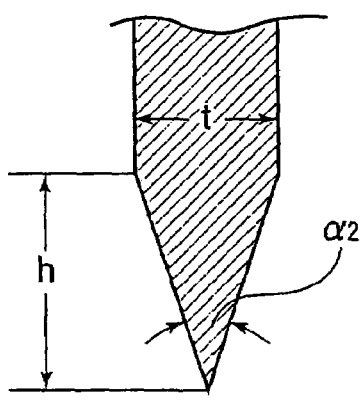
Figure 7:
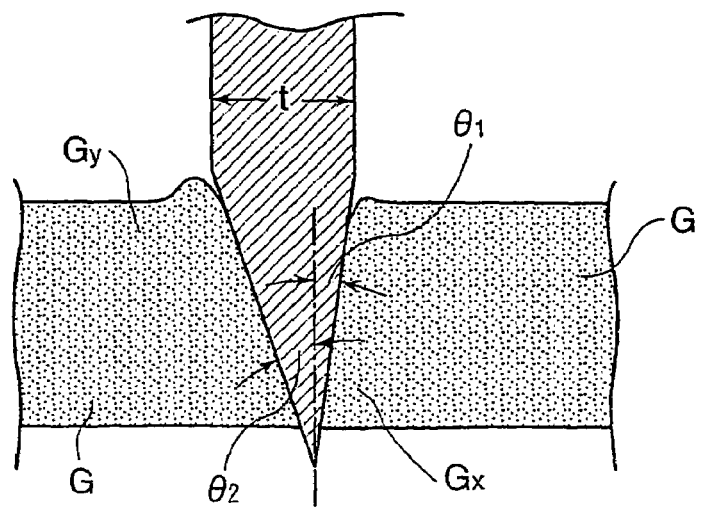
Figure 8:
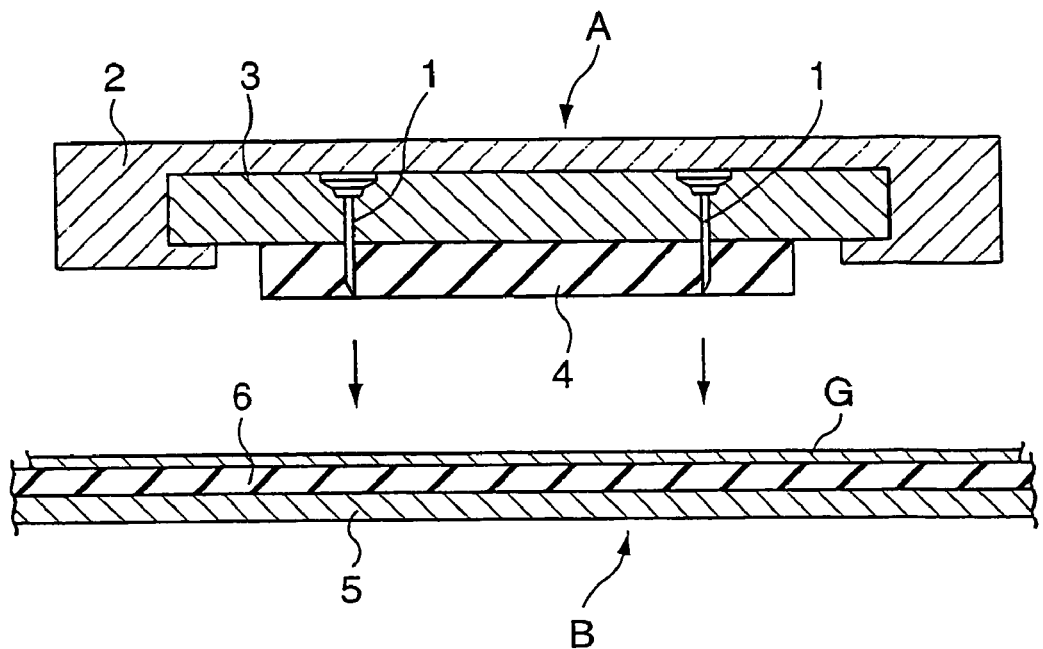
Figure 9:
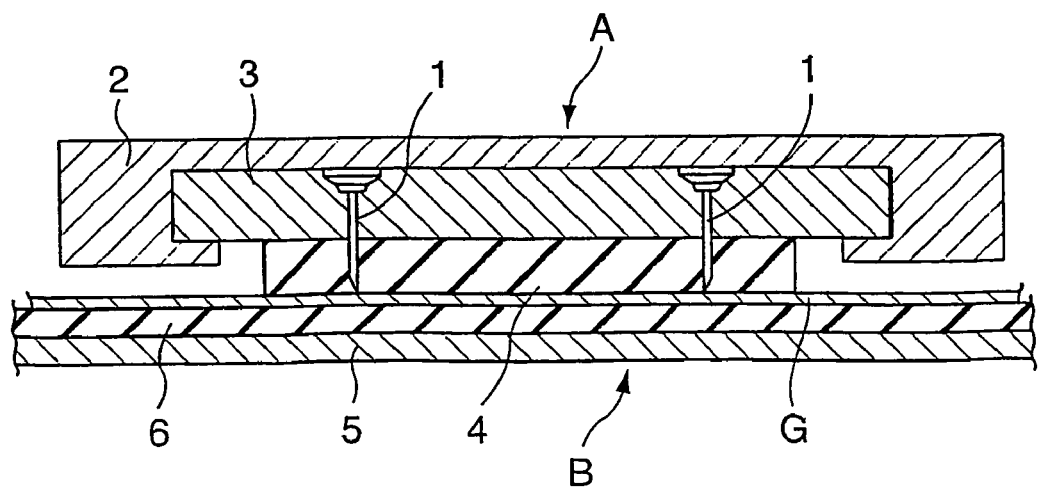
Figure 10:
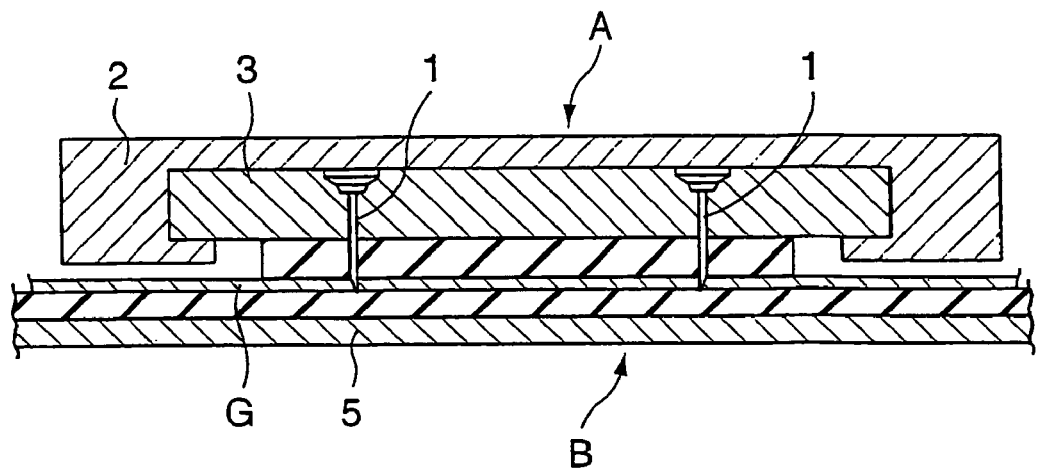
Figure 11:
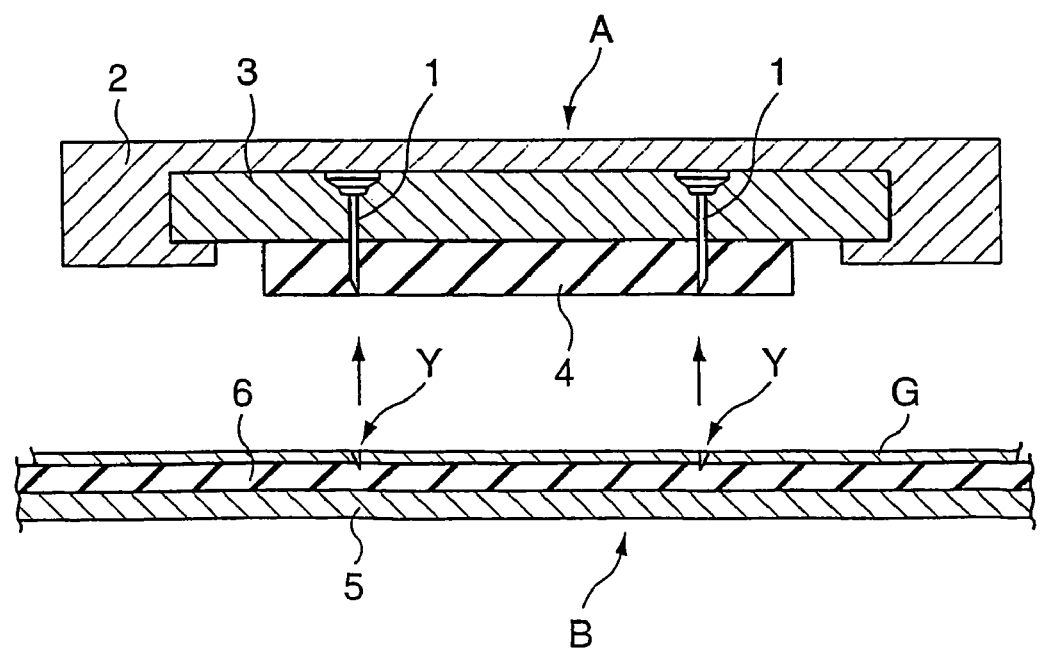
Figure 12:
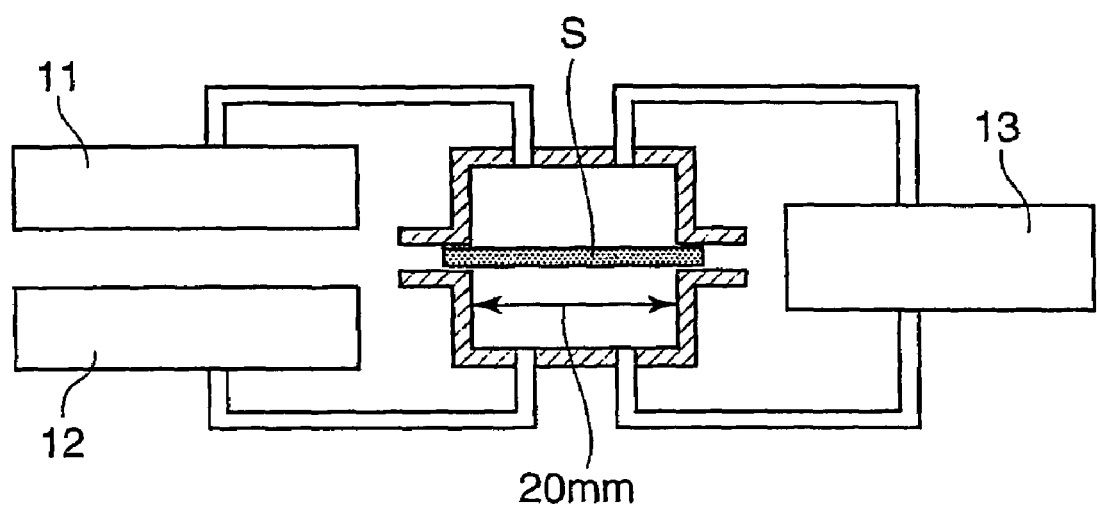

FIG. 5 is a view showing an example of the particle size distribution of a slurry which is preferably used upon producing a green body which becomes a precursor of an electrode substrate according to the present invention;

FIG. 6 is an explanatory side view illustrating the blade edge shape of a preferred punching blade used to punch a green sheet upon producing an electrode substrate for a fuel cell according to the present invention;

FIG. 7 is an explanatory sectional view illustrating the blade edge shape of a preferred punching blade used to punch a green sheet upon producing an electrode substrate for a fuel cell according to the present invention;

FIG. 8 is an explanatory sectional view illustrating a preferred example expect FIG. 7 of a punching blade used in the present invention;

FIG. 9 is an explanatory schematic sectional view showing the structure of a punching machine adopted preferably in the present invention and a punching work example;

FIG. 10 is an explanatory schematic sectional view showing the structure of the punching machine adopted preferably in the present invention and the punching work example;

FIG. 11 is an explanatory schematic sectional view showing the structure of the punching machine adopted preferably in the present invention and the punching work example; and FIG. 12 is an explanatory view showing an outline of a gas permeation resistance measuring device used in examples of the present invention.

l: blade edge portion, h: height of blade, p: pitch of blade edge, t: thickness of blade, and $\alpha_1$, $\alpha_2$, $\theta_1$ and $\theta_2$: angle of blade edge

BEST MODE FOR CARRYING OUT THE INVENTION

The present inventors have been advancing research for providing an electrode support substrate which can surely obtain a printed electrode that is particularly dense, even and closely adhesive while gas permeability/diffusibility necessary for a practical electrode support substrate is kept under the above-mentioned themes to be solved.

As a result, it has been found out that a ceramic sheet having a porosity of 20 to 50%, a thickness of 0.2 to 3 mm and a surface area of 50 cm² or more, as a ceramic constituting a substrate. The substrate satisfies the following: the variation coefficient of measured values of the gas permeable amounts of any areas of 4 cm² selected optionally from the whole of the surface area, the values being measured by the method according to JIS K 6400, is from 5 to 20% is substantially even in the state of pore distribution throughout the substrate for supporting an electrode, and can exhibit stable and superior gas permeability/diffusibility.

The electrode support substrate of the present invention is essentially a porous substrate having electrical conductivity, superior thermal shock resistance and mechanical strength and further having sufficient gas permeability/diffusibility, as described above. The specific structure of the electrode support substrate which can satisfy these requirements will be described in detail hereinafter.

The electrode support substrate comprises, as main constituting materials, a conductive component for giving electrical conductivity, and a ceramic material which becomes a skeleton component of a substrate. The conductive component is a component essential for giving electrical conductivity to the substrate. Examples of the component which becomes a component of an anodic electrode support substrate include metals oxides which are changed to conductive metals under reducing atmosphere when the fuel cell operates, such as iron oxide, nickel oxide and cobalt oxide; metal oxides which exhibit electrical conductivity in reducing atmosphere, such as ceria, yttria-doped ceria, samaria-doped ceria, prasea-doped ceria, and gadolia-doped ceria; and noble metals which exhibit electrical conductivity, such as platinum, palladium, and ruthenium. These may be used alone, or may be used in combination of two or more which are appropriately selected therefrom if necessary. Of these conductive components, nickel oxide has the highest wide-usability, considering cost or electrical conductive characteristics.

The skeleton component is a component important for keeping strength necessary for an electrode support substrate, in particular, strength which resists thermal shock and stacking-load and further important for relieving difference in thermal expansion from the solid electrolyte. In the case that the solid electrolyte is zirconia, a single material or a composite material from zirconia, alumina, magnesia, titania, aluminum nitride, mullite and others are used. Of these, stabilized zirconia has the highest wide-usability. Preferred examples of the stabilized zirconia include solid solutions obtained by dissolving, into zirconia, one or more oxides selected from the following as a stabilizer or stabilizers: oxides of alkaline earth metals, such as MgO, CaO, SrO and BaO; oxides of rear earth elements, such as $Y_2O_3$, $La_2O_3$, $CeO_2$, $Pr_2O_3$, $Nd_2O_3$, $Sm_2O_3$, $Eu_2O_3$, $Gd_2O_3$, $Tb_2O_3$, $Dy_2O_3$, $Er_2O_3$, $Tm_2O_3$, and $Yb_2O_3$; and $Sc_2O_3$, $Bi_2O_3$, and $In_2O_3$. Additional preferred examples include dispersion strengthened zirconia wherein a dispersing strengthening agent such as alumina, titania, $Ta_2O_5$ or $Nb_2O_5$ is added to the above-mentioned solid solutions.

There can also be used a ceria based or bismuth based ceramic wherein one or more of the following are added to $CeO_2$ or $Bi_2O_3$: CaO, SrO, BaO, $Y_2O_3$, $La_2O_3$, $Ce_2O_3$, $Pr_2O_3$, $Nb_2O_3$, $Sm_2O_3$, $Eu_2O_3$, $Gd_2O_3$, $Tb_2O_3$, $Dr_2O_3$, $Ho_2O_3$, $Er_2O_3$, $Yb_2O_3$, PbO, $WO_3$, $MoO_3$, $V_2O_5$, $Ta_2O_5$ and $Nb_2O_5$; or a gallate based ceramic such as $LaGaO_3$.

Of these, particularly preferable are zirconia stabilized with 2.5 to 12% by mole of yttria, or zirconia stabilized with 3 to 15% by mole of scandia.

The content blend between the conductive component and the skeleton component is important for giving appropriate electrical conductivity and strength property to the resultant electrode support substrate. When the amount of the conductive component becomes relatively large, the electrical conductivity of the substrate is improved but the strength property lowers since the amount of the skeleton component becomes relatively small. Conversely, when the amount of the conductive component becomes relatively small, the strength property becomes high because of an increase in the amount of the skeleton component. Thus, the blend ratio between the two should be appropriately decided under the consideration of the balance between the above-mentioned matters. The ratio is changed on the basis of the kind of the conductive component, and others, but it is preferable in the present invention, which mainly aims at an anodic electrode support substrate, that the ratio of the skeleton component amount to the conductive component amount is in the range of 60-20 to 40-80% by mass, more generally 50-30 to 50-70% by mass.

The electrode support substrate of the present invention comprises a conductive component and a skeleton component, as described above. The mechanical strength and thermal stress resistance thereof are kept by the skeleton component, and electrical conductivity is given to the substrate by the conductive component. The electrode support substrate, which is made of them, needs to have pores through which a fuel gas or a burning exhaust gas permeates or diffuses, as described above. In order to pass these gases smoothly under low pressure loss, it is indispensable that the substrate has a porosity of 20% or more as a whole under oxidizing atmosphere. If the porosity is less than 20%, the gases permeate or diffuse insufficiently so that the efficiency of power generation falls. The porosity is more preferably 25% or more, even more preferably 30% or more.

However, if the porosity is too large, the strength property and thermal stress resistance of the substrate lower so that the following tendencies are generated: when the substrate is integrated into a stack, the substrate is easily cracked or deteriorated by staking-load, thermal shock or the like; or the distribution state of the conductive component becomes thin so that the substrate has an insufficient electrical conductivity. Therefore, it is advisable that the porosity is restrained into 50% or less at highest, preferably 45% or less, more preferably 40% or less.

It is indispensable that the thickness of the electrode support substrate of the present invention is in the range of 0.2 to 3 mm. If the thickness is less than 0.2 mm, the substrate is too thin so that the substrate does not easily keep strength for a practical electrode support substrate. On the other hand, if the substrate is made excessively thick to make the thickness into more than 3 mm, the strength is improved but when a large number of the electrode support substrates are laminated to be made practicable as a cell stack, the whole of the laminated structure becomes thick. The structure is not easily suitable for a desire that the structure is made compact as a power generator. When the electrode support substrate is made practicable as a substrate for a fuel cell, the thickness thereof is more preferably 0.3 mm or more and 2 mm or less.

The size of the electrode support substrate according to the present invention, which depends on the use purpose or scale thereof, is important for ensuring electric power generation at a level satisfactory for practical use. For this purpose, the substrate should ensure a necessary and minimum surface area. It is desired that the substrate ensures a sheet area (surface area on a single side thereof) of 50 cm$^2$ or more, more preferably 100 cm$^2$ or more.

It is essential that the electrode support substrate satisfies the following: under the conditions that the above-mentioned porosity, thickness and surface area are satisfied, the above-mentioned variation coefficient of the measured values of the gas permeable amounts of any plural areas of 4 cm$^2$ selected optionally from the whole of the surface area of the substrate ranges from 5 to 20%, and the substrate exhibits substantially even gas permeability/diffusibility as a whole.

In order to pass a fuel gas or a reaction-produced gas rapidly into the electrode support substrate, it is naturally preferred that the whole of the substrate has even gas permeability/diffusibility as a whole. For this purpose, it is desired that the distribution state of pores throughout the substrate is even.

However, only by measuring the porosity of the whole, it is impossible to specify whether the pores are pores continuing to the inside of the substrate or pores which are closed inside the substrate. Thus, the porosity may be insufficient as information on permeability.

Permeability is an important factor as a physical property of any electrode support substrate. The permeability thereof has been repeatedly investigated, so as to find out: when the gas permeable amounts of any specified areas in the entire surface area of a substrate fluctuate, a fuel gas is unevenly distributed in the entire surface of the substrate to generate locally regions where electric power generation is large and regions where electric power generation is small, so that a temperature distribution is generated to cause the generation of a crack in the substrate; and the specification of the fluctuation causes the electrode support substrate to exhibit excellent property for a practical electrode support substrate.

The size of any electrode support substrate for a solid oxide type fuel cell is expected to be from about 50 to 1000 cm$^2$, more generally about 100 to 500 cm$^2$ for practical use. Therefore, a standard for checking the evenness of the distribution state of pores throughout the substrate has been defined as 4 cm$^2$, which is 1/10 or less of the minimum area 50 cm$^2$ of the substrate, considering the minimum area. In the case that the area to be measured is made smaller, the distribution state of the pores throughout the substrate can be observed. Thus, this case is preferred. However, even if an area having each side of 1.5 cm length (area: 2.25 cm$^2$) was measured, a significant different between the measurement results and the measurement results about 4 cm$^2$ was not recognized. In the measurement of the gas permeability distribution, it is preferable that at least five spots are selected optionally from the entire surface of a supplied substrate and then the gas permeable amounts thereof are measured. In the present invention, the variation coefficient of measured values of the gas permeable amounts obtained by this method is specified as 5 to 20%.

Any one of the gas permeable amounts is a value measured according to gas permeable amount measuring method of JIS K 6400 (1997) about soft urethane foam testing methods. Specifically, a stationary flow differential pressure measuring method is adopted which comprises cutting a substrate into a piece 3 cm square (area: 9 cm$^2$) with a diamond cutter, reducing the pressure on a single surface side (low pressure side) of this test piece, introducing air onto the other surface side thereof, and measuring the gas permeable amount by an increase in the pressure on the low pressure side. Both ends of the test piece are used by 0.5 cm, respectively, to hold the test piece, thereby yielding an effective gas permeable area of 4 cm$^2$. As the resultant gas permeable amount data of the supplied substrate, the variation coefficient is used which is obtained by obtaining the standard deviation for representing the fluctuation or scattering of measured values of the gas permeable amount relatively, and then dividing it by the average thereof.

In the present invention, the variation coefficient is specified as 5 to 20%, more preferably 5 to 15%, even more preferably 5 to 13%. For reference, if the variation coefficient exceeds 20%, the substrate is cracked or broken in almost all cases. It appears that this is based on the following reason: when a fuel gas permeates through the inside of the substrate, the gas cannot pass evenly to be unevenly distributed so that the fuel gas reaching the vicinity of the electrolyte becomes uneven dependently on spots; consequently, regions where electric power generation is large and regions where this is small can be locally generated so that a temperature distribution is generated.

If the gas permeable amount in the substrate is completely constant over the entire surface thereof, the variation coefficient is 0%. However, the variation coefficient obtained by the above-mentioned method is 5% at lowest; therefore, this is decided as the lower limit for practical use.

In the present invention, it is desired that the distribution state of the pores throughout the substrate is even and further it is preferable that the size of the pores is 3 μm or more and 20 μm or less as the average diameter thereof. If the average diameter of the pores is less than 3 μm, the gas permeability/diffusibility are insufficient so that the same problems as in the case that the porosity is insufficient may be caused. Conversely, if the average diameter is too large, the strength tends to deteriorate and the electrical conductivity tends to be insufficient in the same manner as in the case that the porosity is excessive. Therefore, it is preferable to suppress the diameter into 20 μm or less.

The porosity of the substrate, the variation coefficient of measured values of the gas permeable amounts, and the preferable average diameter of the pores can be adjusted by the kind and the blend amount of a pore-forming agent used when the substrate is produced, the particle size construction of starting material powder, the temperature at the time of firing a green sheet which will become a substrate precursor, and others. Specific methods thereof will be described later.

As described, an anodic electrode or an electrolyte layer is formed on a single surface of the electrode support substrate of the present invention by screen printing or the like. In order to make the electrode or electrolyte printing even and sure with close adhesion, it is necessary to control the surface thereof into an appropriate surface roughness. The present inventors have made it evident by experiments that the maximum roughness depth (Rmax: German Standard "DIN 4768") thereof is set to 1.0 μm or more and 40 μm or less. Furthermore, in the electrode support substrate of the invention, which is porous in order to ensure the gas permeability/diffusibility thereof, whether the surface property is good or bad cannot be precisely estimated according to the surface roughness obtained by using a contact type surface roughness meter which is generally adopted for dense sheets. Thus, it is desired that the surface is made to satisfy the above-mentioned Rmax on the basis of the surface roughness measured with a laser optical manner three-dimensional shape measuring device.

If the Rmax is less than 1.0 μm, the surface is too smooth so that the electrode printing tends to be insufficient in close adhesion. Thus, it is feared that the printed electrode layer is peeled from the substrate by thermal shock receiving when the fuel cell is handled or operated. Additionally, the gas permeability/diffusibility tend to turn insufficient. On the other hand, if the Rmax exceeds 40 μm, the thickness of the electrode layer becomes uneven when the electrode is printed, or a part of the electrode-constituting material is embedded in concave portions in the surface. Thus irregularities are formed in the electrode layer surface to result in an increase in electric conductance loss. Furthermore, a crack may be generated in the electrode layer when the electrode-constituting material is fired or the resultant cell is used as a fuel cell. In order to decrease the electric conductance loss as much as possible and heighten the close adhesion of the printed electrode layer, the Rmax is more preferably 0.2 μm or more and 30 μm or less, even more preferably 20 μm or less.

The reason why the laser optical manner three-dimensional shape measuring device, which is of a non-contact type, is used in the present invention to evaluate the surface roughness is based on the following. In the case of the electrode support substrate of the invention, which is porous and has a surface on which innumerable pores are opened, the surface roughness is not smoothly and easy measured with any surface roughness meter of a contact type, such as a stylus type, since the stylus is caught by the pores; moreover, the surface roughness cannot be precisely measured in the contact manner since the pores opened in the surface are relatively deep.

At any rate, in the present invention, the variation coefficient of measured values of the gas permeable amounts, which is obtained by the above-mentioned method, is from 5 to 20%, and further the maximum roughness depth (Rmax) is preferably made into an appropriate range. Thereby make it possible to print an electrode on surface of substrate, substrate is porous and have even in thickness, which has even gas permeability/diffusibility in the entire surface thereof not to cause any uneven gas flow or any extreme temperature distribution when the electrode is operated, and which has a highly close adhesion. In order to ensure such evenness of the gas permeability/diffusibility and an appropriate surface roughness, it is necessary to control properly the particle size construction of starting material powder used to produce a green sheet which will become a precursor of the ceramic which constitutes the electrode support substrate, conditions for producing or firing the green sheet, and others. These will be described later.

Since a large number of the electrode support substrates of the invention are laminated in the upper and lower directions so as to be integrated into a stack as described above, the stack is subjected to a large stacking-load and further receives thermal shock or thermal stress based on heat generated when the stack is operated. Therefore, even if a slight number of burrs or projections are present on the lamination faces, stress is concentrated on the portions thereof so that cracking or breaking may be caused. When such cracking or breaking is generated in the substrates, the cracking spreads to the anodic electrodes and others formed on the surfaces so that the electrical conductivity thereof is blocked. If the cracking or breaking spreads to the solid electrolyte film, the effect of shielding the fuel gas and others is lost so that the stack comes not to act as a fuel cell. If the burrs, projections or undulations on the substrate surface(s) become large, the anodic layers and the solid electrolyte layer(s) formed on the surfaces become uneven and further the adhesion of the layers to the substrates becomes poor. It is therefore desired that the burrs generated to the circumferential edges of the substrates are made as small as possible and further the projections or undulations on the substrate surfaces are preferably made as small as possible, thereby restraining local stress concentration generated in the lamination state into as small a value as possible.

The present inventors has made it evident by experiments that: a substrate sheet wherein height of burrs in the circumferential edge thereof, measured with a laser optical manner three-dimensional shape measuring device, is ½ or less of the thickness of the sheet, the height of the largest projection measured with the same laser optical manner three-dimensional shape, measuring device, is preferably ⅓ or less of the sheet thickness, and the height of the largest undulation, measured with the same laser optical manner three-dimensional shape measuring device, is ⅓ or less of the sheet thickness. The substrate sheet exhibit stable and have superior resistance against stacking-load, thermal shock resistance, and thermal stress resistance. Further the substrate sheet can have superior performance about printing adaptability when an electrode is formed or a solid electrolyte film is formed thereon.

If the height of the burrs in the substrate circumferential edge exceeds ½ of the sheet thickness, at the time of using this substrate as one element and integrating the substrate into a stack, stress based on integrating force or stacking-load is concentrated onto the large burr. Consequently, before the stack is operated as a fuel cell, the substrate is broken or cracked together with the electrode layers or solid electrolyte films thereon. Alternatively, the stress-concentrated portions are cracked or broken by receiving thermal hysteresis when the stack is operated even if cracks and others are not generated at the time of the integration. Thus, the power generation performance of the fuel cell is remarkably decreased. However, it has been made evident that: a substrate wherein the burr height is ½ or less of the sheet thickness, more preferably ⅓ or less thereof, even more preferably ¼ or less thereof is hardly cracked or broken even if the substrate receives stacking-load or thermal stress at a practical level; and this substrate can use as substrate for a fuel cell which can maintain a given power-generating performance for a long term.

Figure 1:
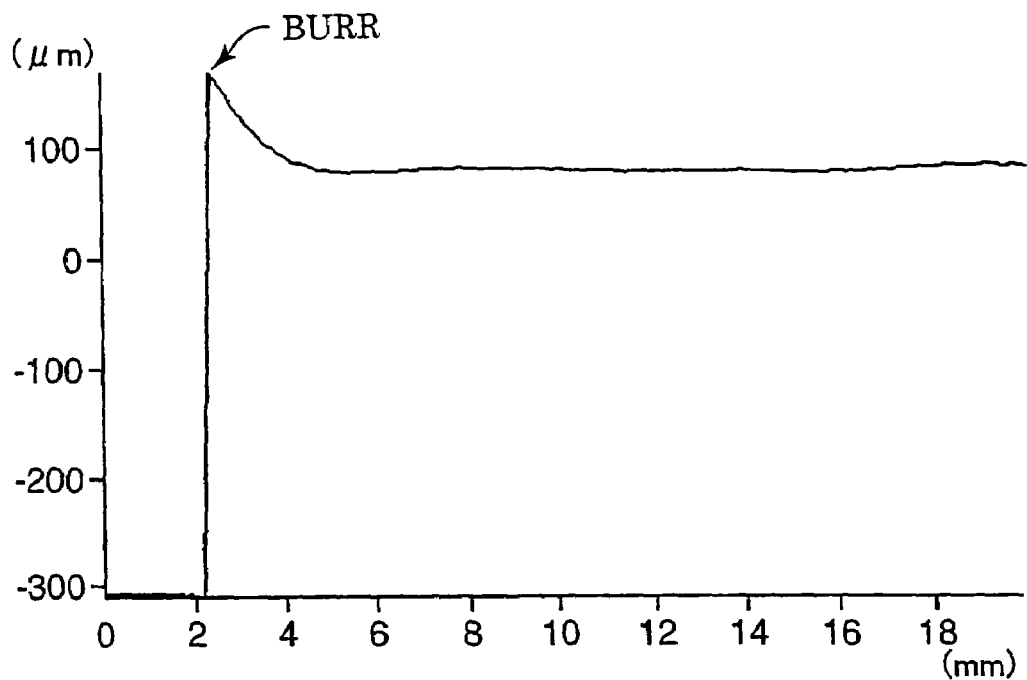
FIG. 1 is a frequency graph illustrating a preferred particle size distribution of a slurry, for producing a green body, which is preferably used upon producing an electrode support substrate for a fuel cell according to the present invention.

The burr height in the present invention means the difference between the highest portion and the lowest portion in a section in a perpendicular line direction from the external circumferential (or internal circumferential) edge of a cut face of a substrate, and can be obtained with a laser optical manner three-dimensional shape measuring device, which is of a non-contact type, as illustrated, for example, in FIG. 1.

At any rate, when the burr height obtained by the above-mentioned method is restrained into ½ or less of the sheet thickness in the present invention, local stress concentration based on load or thermal shock in the laminated state is suppressed into a minimum so that the generation of cracking or breaking can be suppressed into a minimum. In order to obtain such a surface roughness, it is important to contrive a blade shape when a green sheet which becomes a ceramic precursor constituting the electrode substrate is subjected to punching work. This will be described later.

In the present invention, it is desired to make the height of the largest projection or the largest undulation on the substrate surface, besides the burr height, as small as possible. The standard thereof is as follows: in order to restrain stress concentration when stacking-load is received and restrain cracking or breaking similarly and further make even an electrode layer or a solid electrolyte film formed on the electrode surface, the largest projection height, measured with the same laser optical manner three-dimensional shape measuring device, is desirably set to ⅓ or less of the sheet thickness, more preferably ¼ or less thereof, even more preferably ⅕ or less thereof and the largest undulation height is desirably set to ⅓ or less of the sheet thickness, more preferably ¼ or less thereof, even more preferably ⅕ or less.

Figure 2:
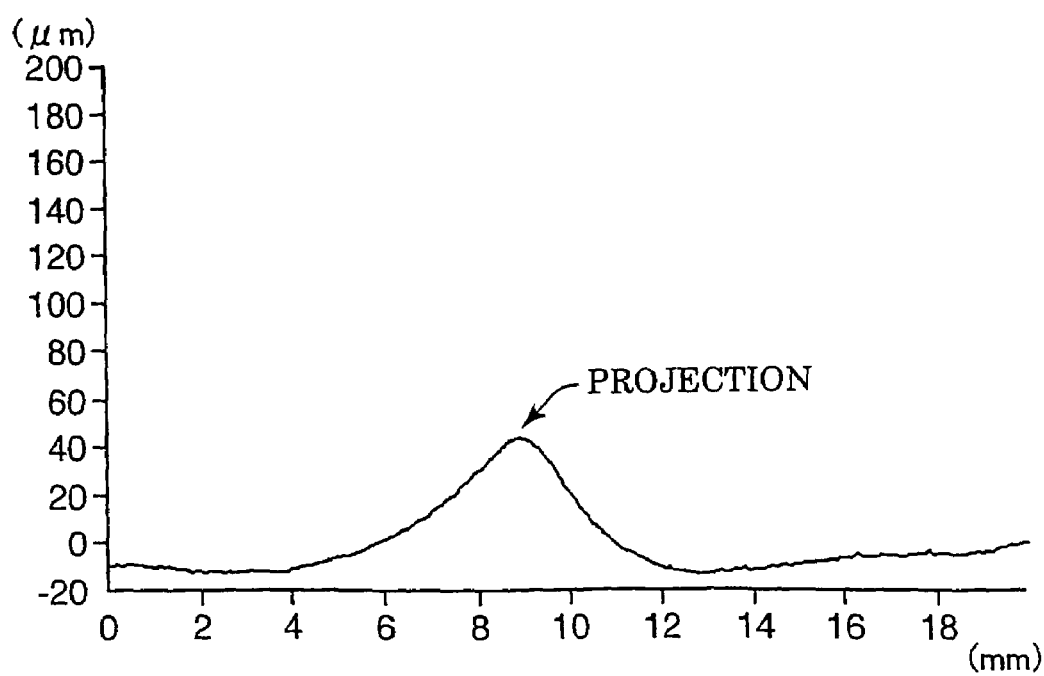
FIG. 2 is an explanatory sectional view illustrating the shape of a burr formed on an electrode substrate, which is measured with a laser optical manner three-dimensional shape measuring device.

The projections mean convex portions which are basically independently generated on the surface of the electrode sheet and have a diameter of about 2 to 15 mm (more generally 5 to 10 mm), for example, as illustrated in FIG. 2, and the undulations mean distortion which is easily generated on the electrode sheet, in particular, a circumferential edge portion thereof and which is continuous into a wave form, for example, as illustrated in FIG. 3. These can be obtained by radiating a laser ray onto the surface of the sheet and analyzing the light reflected thereon three-dimensionally.

The shape of the ceramic sheet which constitutes the electrode support substrate of the present invention may be any shape, such as a circle, ellipse, rectangle, or rectangle having a roundish corner, and may be a shape wherein such a sheet has therein one or more holes which have a shape of a similar circle, ellipse, rectangle or rectangle having a roundish corner, or some other shape. The area of the sheet is not particularly limited, and is generally 50 $cm^2$ or more, more preferably 100 $cm^2$ or more, even more preferably 200 $cm^2$ or more under the consideration of practical use. When the holes are present in the sheet, this area means the total area including the area of the holes.

The following describes a process for producing an electrode support substrate according to the present invention.

About the electrode support substrate of the present invention, a powder made of a metal or metal oxide which becomes the above-mentioned conductive component, a metal oxide powder which becomes the skeleton component, and a pore-forming agent powder blended for making pores are homogeneously mixed with an organic or inorganic binder, a dispersing medium (solvent), an optional dispersing agent, an optional plasticizer and others in the same method as described above, so as to prepare a paste. The resultant paste is applied onto a flat and smooth sheet (such as a polyester sheet) by any method such as a doctor blade method, a calendar roll method or an extruding method, so as to have an appropriate thickness. The resultant is dried to volatilize and remove the dispersing medium (solvent), thereby yielding a green sheet.

The pore-forming agent used herein may be an agent of any kind if the agent is burned up under the above-mentioned firing conditions. The following is used: a natural organic powder such as wheal powder, corn starch, sweet potato powder, potato powder or tapioca powder, a crosslinked fine particle aggregate made of (meth)acrylic resin or the like, a thermally-decomposing or sublimating resin powder of melamine cyanurate, or a carbonous powder such as carbon black or activated carbon Of these, preferable are corn starch, the acrylic crosslinked fine particle aggregate, carbon black and so on since they can carry and contain a large amount of the conductive component as described later.

The shape of these pore-forming agent powders is desirably a spherical shape or a rugby ball shape in order to cause a large amount of the conductive component to be carried and contained therein and promote an even distribution of the conductive component into the ceramic substrate obtained by firing. Preferably, the powder or fine particle aggregate itself has pores or capillaries so as to cause the conductive component to be contained in the powder or the fine particle aggregate.

A preferable particle size of the powder or the crosslinked fine particle aggregate which become the pore-forming agent is 0.5 to 100 μm, more preferably 3 to 50 μm as the average particle size thereof measured with a laser diffraction type particle size distribution meter (trade name:

"SALD-1100", manufactured by Shimadzu Corp.), and is 0.1 to 10 μm, more preferably 1 to 5 μm as the 10% by volume diameter thereof.

Particularly preferable is a fine particle aggregate of 0.5 to 100 μm average particle size, wherein crosslinked polymer fine particles of 0.01 to 30 μm average particle size aggregate with each other, the fine particle aggregate being obtained by emulsion-polymerizing a (meth)acrylic monomer, as disclosed in, for example, JP-A 2000-53720.

In the present invention, the pore-forming agent may be mixed with each of the above-mentioned starting powders to prepare slurries for forming the green sheet. It is however effective to mix or compound the pore-forming agent and the above-mentioned conductive component and subsequently mix the resultant with the other staring materials. That is, the following method can be adopted:

(1) a method of blending the conductive component powder or a precursor compound thereof with the pore-forming agent at a given ratio, and wet-mixing or dry-mixing the blended components, thereby sticking the conductive powder or the precursor compound evenly onto the surface of the pore-forming powder, (2) a method of sticking the conductive component powder or a precursor compound evenly onto the surface of the pore-forming agent by a spray method or the like, and (3) a method of incorporating the conductive component powder or a precursor compound thereof into pores or gaps in a fine particle aggregate for forming pores.

More specifically, it is possible to modify a method as disclosed in JP-A 07-22032 (1995) and adopt a method of mixing the pore-forming agent powder with a precursor compound which can generate an conductive component by thermal decomposition, and volatilizing the solvent while dry-pulverizing the mixture in a mill or the like, or volatilizing the solvent while wet-pulverizing the mixture, or some other method.

It is preferable to adopt a method as disclosed in JP-A 2000-53720 or JP-A 2001-81263 or some other method. It is emulsion-polymerized a (meth)acrylic polymerizable monomer mixture to produce a fine particle aggregate of 0.5 to 100 μm average particle size wherein crosslinked polymer fine particles of 0.01 to 30 μm average particle size adhere to each other. The fine particle aggregate mix with a precursor compound which can generate an conductive component by thermal decomposition, causing these to enter gaps in the fine particle aggregate, and then drying the resultant to volatilize and remove the solvent.

When the pore-forming agent into which the conductive component is incorporated is used in this way, the following advantageous effects can be obtained: the pore-forming agent is burned up when the green sheet is fired, so that pores are made in the portions thereof when the conductive component is also present in the portions, the pores are present near the conductive component after the firing; and even if the conductive component is oxidized to undergo volume expansion at the time of making the substrate practicable as an electrode support substrate for a fuel cell, the above-mentioned pore portions absorb strain generated by the volume expansion so that the generation of breaking or cracking, which may easily be caused in the electrode support substrate, is prevented. As a result, in particular, the thermal shock resistance and the thermal stress resistance of the electrode support substrate can be made high.

The pore-forming agent is an important component, which is burned up at the time of the heating and firing as described above so as to give gas permeability/diffusibility to the electrode support substrate. In order to ensure a porosity of 20% or more and 50% or less, which is desired for the porous body in the present invention, it is desired that the blend amount of the pore-forming agent is set to 2 parts or more and 40 parts or less, more preferably 5 parts or more and 30 parts or less by mass for 100 parts by mass of the total of the conductive component powder and the skeleton component powder. If the blend amount of the pore-forming agent is insufficient, pores made by thermal decomposition when the green sheet is heated and fired tend to be short so that an electrode support substrate having satisfactory gas permeability/diffusibility is not easily obtained. Conversely, if the blend amount of the pore-forming agent is too large, the number of the pores made at the time of the heating and firing becomes excessively large so that the sintered product becomes sufficient in strength and further a flat substrate is not easily obtained. In this case, it is possible to advance the sintering and lower the porosity by making the sintering temperature high or extending the sintering time. However, this is not economical since a long time is required for the sintering and further energy consumption also increases to a large extent.

The kind of the binder used in the production of the green sheet is not particularly limited, and a binder selected appropriately from organic binders which have been known hitherto can be used. Examples of the organic binders include ethylene type copolymer, styrene type copolymer, acrylate or methacrylate type copolymer, vinyl acetate type copolymer, maleic acid type copolymer, vinyl butyral type resin, vinyl alcohol type resin, waxes, and ethyl celluloses.

Of these, the following examples are given from the viewpoints of the formability into a green sheet, punchability, strength, thermal decomposability when they are fired, and others: polymers obtained by polymerizing or copolymerizing at least one of alkyl acrylates having an alkyl group having 10 or less carbon atoms, such as methyl acrylate, ethyl acrylate, propyl acrylate, butyl acrylate, isobutyl acrylate, cyclohexyl acrylate, and 2-ethylhexyl acrylate; alkyl methacrylates having an alkyl group having 20 or less carbon atoms, such as methyl methacrylate, ethyl methacrylate, butyl methacrylate, isobutyl methacrylate, octyl methacrylate, 2-ethylhexyl methacrylate, decyl methacrylate, dodecyl methacrylate, lauryl methacrylate, and cyclohexyl methacrylate; acrylates or methacrylates having a hydroxyalkyl group, such as hydroxyethyl acrylate, hydroxypropyl acrylate, hydroxy methacrylate, and hydroxypropyl methacrylate; aminoalkyl acrylates or aminoalkyl methacrylates, such as dimethylaminoethyl acrylate, and dimethylaminoethyl methacrylate; carboxyl-containing monomers, such as acrylic acid, methacrylic acid, maleic acid, and monoisopropyl maleate. These may be used alone. Alternatively, if necessary, these may be used in an appropriate combination of two or more thereof.

Of these, particularly preferable are acrylate or methacrylate type copolymers having a number-average molecular weight of 5,000 to 200,000, more preferably 10,000 to 100,000. Of these, the following is recommendable as preferred one: copolymer comprising, as a monomer component, isobutyl methacrylate and/or 2-ethylhexyl methacrylate in an amount of 60% or more by mass.

About the use ratio between the starting powders (the total of the conductive component, the skeleton component, and the pore-forming agent) and the binder, the amount of the latter is 5 parts or more and 30 parts or less, more preferably 10 parts or more and 20 parts or less by mass for 100 parts by mass of the former. If the used amount of the binder is short, the strength or the flexibility of the green sheet becomes insufficient. Conversely, if the amount is too large, the viscosity of the slurry is not easily adjusted and further the binder component is actively decomposed or released into a large amount when the green sheet is fired. Thus, the surface property of the green sheet does not become even with ease.

As the dispersing medium used in the production of the green sheet, the following is appropriately selected and used: an alcohols such as methanol, ethanol, 2-propanol, 1-butanol, 1-hexanol or 1-hexanol; a ketone such as acetone or 2-butanone; an aliphatic hydrocarbons such as pentane, hexane, or heptane; an aromatic hydrocarbons such as benzene, toluene, xylene, or ethylbenzene; an acetates such as methyl acetate, ethyl acetate, or butyl acetate; or the like. These dispersing medium may be used alone. Alternatively, if necessary, these may be used in an appropriate combination of two or more thereof. The most ordinary ones of these dispersing medium are 2-propanol, toluene, ethyl acetate and so on.

In the preparation of the slurry for producing the green sheet, the pore-forming agent powder into which the above-mentioned conductive component powder or a precursor compound thereof is incorporated, the skeleton powder, and an conductive component powder which may be optionally replenished are homogeneously mixed with the binder, the dispersing medium, an optional dispersing agent for promoting the dissociation or dispersion of the starting powders, an optional plasticizer and others, so as to prepare the slurry in a homogeneous dispersion state.

As the dispersing agent used therein, the following is used: a polymer electrolyte such as polyacrylic acid or polyacrylic ammonium; an organic acid such as citric acid or tartaric acid; a copolymer made from isobutylene and styrene or maleic anhydride, or an ammonium salt or amine salt thereof; a copolymer made from butadiene and maleic anhydride. The plasticizer has an effect of making the flexibility of the green sheet high, and specific examples thereof include phthalates such as dibutyl phthalate and dioctyl phthalate; and glycols such as propylene glycol and glycol esters.

The starting powder which becomes the skeleton of the electrode support substrate according to the invention is preferably one wherein the average particle size is 0.1 µm or more and 3 µm or less and the particle size of the 90% volume thereof is 6 µm or less; more preferably one wherein the average particle size is 0.1 µm or more and 1.5 µm or less and the particle size of the 90% volume is 3 µm or less; and even more preferably one wherein the average particle size is 0.2 µm or more and 1 µm or less and the particle size of the 90% volume is 2 µm or less. The powder used as the starting material of the conductive component is preferably one wherein the average particle size is 0.6 µm or more and 15 µm or less and the particle size of the 90% volume is 30 µm or less; more preferably one wherein the average particle size is 0.6 µm or more and 3 µm or less and the particle size of the 90% volume is 20 µm or less; and even more preferably one wherein the average particle size is 0.6 µm or more and 1.5 µm or less and the particle size of the 90% volume is 10 µm or less. In particular, in the case that nickel oxide powder is used as the constituent material of the conductive component, it is preferable to use a powder wherein the particle size of the 90% volume is 6 µm or less, more preferably 3 µm or less and the amount of contained coarse particles is made as small as possible.

In the case that a powder wherein the average particle size exceeds 3 µm and the particle size of the 90% volume exceeds 6 µm is used as the starting powder which constitutes the skeleton component and further a powder wherein the average particle size exceeds 15 µm and the particle size of the 90% volume exceeds 30 µm is used as the starting powder which becomes the constituent material of the conductive component, desired thermal shock resistance and mechanical strength are not easily obtained since the green sheet is pre-fired to be made porous and further gaps between the particles become pores. On the other hand, in the case that a powder wherein the average particle size is less than 0.1 µm is used as the constituent material of the skeleton component and further a powder wherein the average particle size is less than 0.6 µm is used as the constituent material of the conductive component, pores in the sintered body becomes too small even if the pore-forming agent is used together. As a result, the gas permeability/diffusibility thereof is liable to become insufficient.

However, in order to obtain surely an electrode support substrate satisfying an appropriate surface roughness, that is, the requirement that the maximum roughness depth (Rmax) is 1.0 µm or more and 40 µm or less as the surface roughness measured with a laser optical manner three-dimensional shape measuring device while the variation coefficient of measured values of the gas permeable amounts is kept into the range of 5 to 20%, which is the most important in the invention, it is desired to adopt a process of:

using a slurry for producing of green sheet becoming a ceramic precursor, including an conductive component powder, an skeleton component powder, a pore-forming agent powder and a binder, defoamed under reduced pressure after milling to adjust the viscosity thereof to 40 to 100 poise (25° C.), and kept at room temperature while rotating stirring fans therein at a rotating speed of 5 to 30 rpm for 20 to 50 hours;

fashioning the slurry into a sheet by a doctor blade method to obtain a green sheet;

cutting the green sheet into a given shape; and then firing the green sheet having the given shape.

This is based on the following reason. When this process is adopted, air bubbles present in the slurry adjusted into the given viscosity are effectively removed so that air bubbles remaining in the slurry, in particular, fine air bubbles having a level of 1 µm can be reduced as much as possible. Further the pore-forming agent powder, which is thermally decomposed at the time of the firing so as to make pores in the substrate, can be more evenly dispersed into the slurry. Thereby it makes the distribution of air permeability in the substrate plane slight. Moreover, the effect of ripening the slurry is also obtained with ease so that the slurry can be made more stable.

It is advisable to adjust the viscosity of the slurry into 40 to 100 poise (25° C.). If the viscosity is less than 40 poise, the fluidity of the slurry is too high so that a substrate having a thickness of 1 mm or more, in particular 2 mm or more, is not easily formed. Conversely, if the viscosity exceeds 100 poise, the viscosity is too high so that air bubbles remaining in the slurry, in particular, fine air bubbles having a level of 1 µm are not easily reduced. From such a viewpoint, the slurry viscosity is more preferably from 50 to 80 poise (25° C.).

If the rotating speed of the stirring fans is below 5 rpm, air bubbles present in the slurry is insufficiently removed and further it is difficult to disperse the pore-forming agent powder evenly into the slurry. Consequently, it is indispensable to extend the above-mentioned keeping time to 50 hours or more. Thus, this case is not practicable.

On the other hand, if the rotating speed is over 30 rpm, air is easily incorporated into the slurry while the slurry is stirred. Inversely, air bubbles are easily generated.

From such a viewpoint, a more preferred rotating speed is from 5 to 20 rpm. The shape of the stirring fans is not particularly limited. Preferable are stirring fans each having an anchor shape, which causes air mixture to be reduced.

If the time for keeping the rotation of the stirring fans is less than 20 hours, air bubbles present in the slurry is insufficiently removed and further it is difficult to disperse the pore-forming agent powder evenly into the slurry. Conversely, if the time is made excessively long so as to be over 50 hours, a long time is required for the process. Thus, this case is unsuitable for practical use.

In order to make a scattering in the permeability between lots of the green sheets small in the above-mentioned process, it is advisable to use, as the slurry for producing the green sheets which become ceramic precursors, a slurry obtained by: adding, to the viscosity-adjusted slurry which comprises the conductive component powder, the skeleton component powder, the pore-forming agent powder, and the binder and obtained by defoaming the components under reduced pressure after milling the components to set the viscosity thereof into the range of 40 to 100 poises (25° C.) and then keeping the resultant at room temperature while rotating the stirring fans in the slurry at a rotating speed of 5 to 30 rpm for 20 to 50 hours, a slurry which is subjected to the same milling, has the same composition and has a viscosity not adjusted; defoaming the resultant mixture slurry under reduced pressure to adjust the viscosity into the range of 40 to 100 poise (25° C.); and then keeping the resultant at room temperature while rotating the stirring fans in the slurry at a rotating speed of 5 to 30 rpm for 20 to 50 hours.

In order to make a scattering in the green sheet lots smaller in this case, it is preferable to add 95 to 105 parts by mass of the total of the conductive component powder and the skeleton component powder in the slurry the viscosity of which is not adjusted to 100 parts by mass of the total of the conductive component powder and the skeleton component powder in the viscosity-adjusted slurry.

An instrument used for the defoaming under reduced pressure is preferably a concentrating and stirring defoaming machine having a refrigerator and a collecting tank for collecting solvent and having an internal volume of 10 liters or more, preferably 30 liters or more, more preferably 50 liters or more. According to a separable flask having an internal volume of less than 10 liters and having a cock for reducing pressure, or some other flask, which is used in ordinary laboratories, a substrate having a sufficient quality intended in the present invention is not easily obtained, probably, because of scale effect.

For satisfying the above-mentioned properties, important is the size distribution of particles in the slurry state used in the production of a green sheet which becomes a ceramic precursor which becomes an electrode support substrate, and it is important to use a slurry having one peak in each of the ranges of 0.2 to 2 μm and of 3 to 50 μm in the particle size distribution of the starting slurry for producing the green sheet.

In other words, the surface roughness of a support substrate is affected, to some extent, by the above-mentioned particle size construction of the used starting materials. If coarse materials are used, the surface roughness of the resultant sintered body becomes relatively coarse. If fine materials are used, the surface roughness thereof becomes relatively dense. If a material having the above-mentioned preferable particle size construction is used as each of the conductive component material powder and the skeleton component material powder which constitute the electrode support substrate, this substrate can easily have the above-mentioned proper porosity and a maximum roughness depth (Rmax) in the preferred range.

However, the present inventors have repeatedly made research so as to find out following. A more important matter for obtaining a sintered body satisfying, in particular, the above-mentioned variation coefficient of measured values of the gas permeable amounts and Rmax defined in the present invention is the particle size distribution of solid components contained in the slurry for obtaining a ceramic molded body which becomes a sintering material rather than the above-mentioned particle size construction of the starting powders themselves. Moreover, when a slurry having one peak in each of the ranges of 0.2 to 2 μm and of 3 to 50 μm in the particle size distribution thereof is used to produce a green sheet and then the sheet is fired, a sintered body (electrode support substrate) having a porosity of 20 to 50% and a Rmax of 1.0 to 40 μm can be more surely obtained.

When the slurry is prepared, there is adopted a method of treating the above-mentioned starting material blended suspension including the starting powders in a ball mill or the like to knead and pulverize the powders. Dependently on conditions for the kneading (examples of which include the kind of a dispersing agent, and the added amount thereof), a part of the starting powders aggregates secondarily in this slurry-preparing step and a part thereof is crushed. Therefore, the particle size construction of the starting powders is not kept as it is in the particle size construction of solid components in the slurry. Thus, when the electrode support substrate of the present invention is produced, it is important to adjust the particle size distribution of the slurry-state solid components used to produce a green sheet which is not fired, as a factor which produces the largest effect on the porosity and the surface roughness of the electrode support substrate, to satisfy the above-mentioned requirements.

The particle size distributions of the solid components in the starting powders and in slurry are values measured by the following methods. The particle size distribution of the starting powders is a measured value after using a laser diffraction manner particle size distribution meter "SALD-1100", manufactured by Shimadzu Corp., using, as a dispersing medium, an aqueous solution wherein 0.2% by mass of sodium metaphosphoric acid is added as a dispersing agent to distilled water, adding 0.01 to 1% by mass of each of the starting powders to about 100 $cm^3$ of the dispersing medium, and treating the resultant with ultrasonic waves for 3 to 10 minutes to disperse the powders. The particle size distribution of the solid components in each slurry is a measured value after using a solvent having the same composition as the solvent in the slurry, as a dispersing medium, adding the slurry to 100 $cm^3$ of the dispersing medium into a concentration of 0.1 to 1% by mass, and treating the resultant with ultrasonic waves for 3 to 10 minutes in the same way to disperse the solid components. It is obtained as a particle size distribution frequency graph as illustrated, for example, in FIG. 4.

When the slurry having one peak in each of the ranges of 0.2 to 2 μm and of 3 to 50 μm in the particle size distribution thereof in the slurry state as described above is used to form a green sheet, the formed green sheet is a green body wherein relatively fine particles having of 0.2 to 2 μm size are filled into gaps between relatively coarse particles of 3 to 50 μm size. When this is fired, a sintered body having the preferred surface roughness can be obtained.

In order to ensure the above-mentioned preferable surface roughness, the content ratio by mass of the fine particles of 0.2 to 2 μm size to the coarse particles of 3 to 50 μm size, in the slurry state thereof, is more preferably from 20/80 to 90/10, even more preferably from 40/60 to 80/20. The average particle size of the whole is preferably from 0.2 to 5 μm, more preferably from 0.3 to 3 μm.

Means for adjusting the particle size distribution in the slurry state into the preferable range is not particularly limited, and examples of ordinary methods thereof are as following methods:

(i) a method of pre-firing a part of powders which are starting materials at 900 to 1400° C. for 1 to 20 hours to make the particle size thereof large, and then mixing the part with the powders that are not fired, (ii) a method of separating the addition of starting powders into two stages when the starting powders and others are mixed in a ball mill, and adding a part thereof after a given time passes, thereby suppressing the degree of the pulverization, and (iii) a method of kneading starting powders and others in two kinds of ball mills having balls different in diameter to prepare two slurries of different particle sizes, and then mixing the two slurries.

The above-mentioned methods may be adopted alone. Alternatively, if necessary, two or more out of the methods can be appropriately combined to be carried out.

For the electrode support substrate of the present invention, the following method is adopted: a method of laying and spreading a slurry obtained as described above, which is comprised a ceramic starting powder, a binder, and a dispersing medium, into an appropriate thickness onto a supporting plate or a carrier sheet by a doctor blade method, a calendering method, an extrusion method or some other method so as to be molded into a sheet form, drying this, volatilizing the dispersing medium to yield a green sheet, adjusting the sheet into pieces of an appropriate size by cutting, punching or the like. The resulting sheet of an appropriate size put one of the pieces on a porous setter on a shelf board or put one of the pieces between setters as disclosed in Re-Publication Patent WO 99/59936, and heat and fire the piece in this state, at about 1100 to 1500° C., preferably about 1200 to 1450° C., most preferably about 1250 to 1500° C. in the case of an anodic electrode support substrate, under the atmosphere of air for about 1 to 5 hours.

As the porous setter, there is preferably used a setter, for producing a porous ceramic sheet, which is made of a sheet-form ceramic body comprising 40 to 90% by mass of a (Ni) unit having a high gas permeability so as to emit smoothly gas which is generated in a large amount from the binder or the pore-forming agent when the green sheet is fired.

In the case that the electrode support substrate of the present invention is made practicable for a fuel cell, it is advisable to set the thickness of the sheet to 0.3 mm or more, more preferably 0.5 mm or more and set to 3 mm or less, more preferably 1 mm or less in order to suppress electric conductance loss as much as possible while satisfying required strength.

Incidentally, the burr height, which is very important for preventing cracking or breaking when the electrode support substrate receives stacking-load or the like in the present invention, is remarkably changed by the edge shape of a punching blade used when the green sheet is punched into a given size. It has been found out that when a punching blade wherein the shape of its edge is wave-form is used, the height of burrs formed on the punched-line of the green sheet can be suppressed into a remarkably smaller value than in the case of using an ordinary straight punching blade. The reasons for this would be as follows.

In the case that a straight punching blade is used, the whole of the blade edge contacts the green sheet in a linear form when the green sheet is cut with the blade. Simultaneously, tensile stress is linearly generated in the punching direction so that the cut face of the green sheet comes to be curled in the punching direction. Consequently, large burrs are easily formed. On the other hand, in the case that a wave-form punching blade is used, some parts of the blade edge (that is, the highest points of the wave form) contact the green sheet in the form of points. Therefore, the tensile stress in the punching direction is relieved so that the degree of the curl becomes small. Thus, the burr height would be remarkably lowered.

For example, FIG. 5 is an explanatory view for illustrating a punching blade 1 used preferably in the present invention. A blade edge portion 1a is made into the form of the teeth of a saw. As described above, in order to suppress the curl as much as possible at the time of punching the green sheet to make the burr height small, it is desired to form the blade edge portion 1a as sharp as possible to make the blade edge portion which firstly contacts the green sheet surface as small as possible. Further, it set the angle $\alpha_1$ of the blade edge (which means the angle of the wave-form blade edge portion when the blade is viewed from the side thereof) into the range of about 30 to 120 degrees, more preferably about 45 to 90 degrees, set the height h of the blade into the range of about 0.5 to 2 mm, more preferably about 0.5 to 1 mm, and set the pitch p into the range of about 0.2 to 7 mm, more preferably about 0.2 to 4 mm.

A preferred sectional structure of the punching blade 1 is as illustrated in FIG. 6. The angle $\alpha_2$ of the blade edge (which means the tip angle of any section in the thickness direction of the blade) is preferably from 20 to 70 degrees, more preferably from 20 to 50 degrees, and the thickness t of the edge is preferably from 0.3 to 1 mm, more preferably from 0.4 to 0.7 mm.

For example, as illustrated in FIG. 7, the structure of the blade edge is preferably made as follows: for a green sheet G to be punched, the standing-up angle $\theta_1$ on its Gx side (ordinarily, its internal circumferential side) which will be a punched product is made acuter than the standing-up angle $\theta_2$ on its cut-off side $G_Y$ side (ordinarily, its external circumferential side). The angle $\theta_1$ is preferably from 10 to 25 degrees, more preferably from 10 to 20 degrees, and the angle $\theta_2$ is preferably from 10 to 35 degrees, more preferably from 10 to 30 degrees. By use of the punching blade 1 having a blade edge structure satisfying such angles, burrs formed on the external circumferential edge on the punched-product side can be made even smaller.

In the illustrated example, the blade edge portion having a recurring structure of the same pitch and the same shape is shown. However, the shape of the blade edge portion and the recurring units thereof are not limited to the illustrated example. Of course, it is allowable to modify the shape, the size or the like appropriately and carry out punching as far as the blade structure is a structure suitable for suppressing burrs.

At the time of the punching, it is preferable to drop down the punching blade 1 as perpendicularly as possible to a surface of the green sheet. In this case, it is desirable to sandwich and fix the green sheet between soft and elastic supporting plates not to be out of position.

For example, FIGS. 8 to 11 are explanatory schematic sectional views illustrating the structure of a punching member A used in the present invention, and a punching method using this. A punching blade 1 is fixed to a blade holder 2 with a hard member 3 and further a projecting plate 4 made of a soft rubber or the like is fitted to the front end portion side of the hard member 3. The blade 1 is set not to penetrate through the projecting plate 4, so as not to project from the front end face thereof as far as the projecting plate 4 is not deformed by compression (see FIG. 8). In the illustrated example, illustrated is a structure wherein an elastic plate 6 is laminated also on the upper face of the hard plate 5 in a sheet supporting member B arranged oppositely to the punching member A in order to ensure the fixation of a green sheet even more when the sheet is punched. However, the elastic plate 6 is not necessarily essential. The green sheet G which is an object to be punched is arranged on the supporting member B and then a punching work is performed.

When the green sheet G is punched, the punching member A is caused to approach the surface of the green sheet G put on the sheet supporting member B in the direction substantially perpendicular to the surface, from the state illustrated in FIG. 8. The punching blade 1 fitted into in the punching member A is set not to project from the front face of the projecting plate 4 as described above. Therefore, when the punching member A is caused to approach the green sheet G as described above, the upper face of the sheet G firstly contacts the projecting plate 4 so that the green sheet G is sandwiched from the upper and lower sides between the projecting plate 4 and the elastic plate 6 (see FIG. 9).

Thereafter, the punching member A is further dropped down. As a result, the projecting plate 4 which is made of the elastic material is compressed and deformed so that the punching blade 1 comes to project out toward the green sheet G. Simultaneously, the green sheet G is urged from both sides thereof by elastic force resulting from the elastic deformation of the projecting plate 4 and elastic force, based on the plastic plate 6, from the lower face side of the sheet. Thus, the sheet G is supported and fixed, and in this state the blade 1 advances to punch the sheet (see FIG. 10).

After the punching blade 1 penetrates through the green sheet G so that the sheet is punched, the punching member A is backed up to move the blade 1 backwards from the green sheet G punched portion. In this step, similarly, the sandwich and fixation state is maintained by elastic forces of the projecting plate 4 and the elastic plate 6 until the punching blade 1 is withdrawn from the green sheet G, and the state is cancelled after the punching blade 1 is withdrawn (see FIG. 11. in the figure, y represents the punched portion).

In other words, a fall in the punching dimensional accuracy, based on positional slippage, is prevented and additionally the generation of burrs is restrained as much as possible since the punching and withdrawing which follow the forward and backward movement of the punching blade 1 are performed in the state that the green sheet G is elastically sandwiched and fixed.

Thus, when the present invention is carried out, a blade having a waver-form blade edge portion is used as a device for punching a green sheet, whereby the height of burrs formed in the punched-out portion can be made as low as possible. As a result, when the resultant substrate receives stacking-load or the like, stress concentration on the burrs thereof can be suppressed as much as possible and the generation of cracking or breaking can be suppressed into a minimum. In particular, the green sheet which becomes a precursor of the electrode support substrate according to the present invention comprises a large amount of a pore-forming agent in order to ensure given porosity, and the green sheet is softer than any green sheet used in the production of a dense sintered body. Therefore, burrs generated when the green sheet is punched into a given size easily become large. However, a punching blade and a punching method as described above are adopted, whereby the burrs can be controlled as slightly as possible.

Clacking or breaking caused when the sheet substrate receives stacking-load or the like may also be caused on the basis of large projections, undulations and so on that are present on the substrate surface besides the burrs. Therefore, in order to make the cracking resistance or breaking resistance thereof even higher, the projections or undulations should be made as small as possible as well as the burr height is decreased. About a standard thereof, each of the largest projection height and the largest undulation height is ⅓ or less of the thickness of the sheet, more preferably ¼ or less thereof, even more preferably ⅕ or less thereof, as described above. The reason why the burr height, the largest projection height and the largest undulation height are defined as the ratio thereof to the sheet thickness as described above is that these values tend to be relatively larger as the sheet thickness is larger.

It appears that the largest cause that the projections are generated when the porous electrode support substrate according to the present invention is produced is as follows. In the case that a granular alien substance is present on the shelf board or setter used when the green sheet is fired, the alien substance is caught in the green sheet, which is put thereon, so that the sheet is hindered from being evenly shrunk in a flat state.

It also appears that the largest cause that the undulations are generated is as follows. When the binder or pore-forming agent in the green sheet is burned up so that the sheet is sintered, the content thereof is too large or when the green sheets are put on each other and fired, the burning does not evenly advance with ease. Thus, a scattering in the decomposed amount or burned amount thereof per unit time is generated so that the amount of generated decomposition gas becomes uneven. The shrinkage amount (about 10 to 30% of the length) of the green sheet generated when the sheet is fired is larger in the circumferential edge portion than in the central portion of the sheet. Therefore, the undulations are easily generated in the circumferential edge portion.

Thus, means for suppressing the projections into a minimum may be a method of performing removal and cleaning sufficiently so that adhering particles, fallen particles and others may not be present on the shelf board or setter used in the firing. A specific and effective example of means for suppressing the undulations in a minimum may be a method of suppressing the use of the binder or the pore-forming agent into a minimum and further firing the green sheets in the state that a porous setter is put as a spacer in between the green sheets and a spacer for a weight is put onto the topmost portion, in particular when the green sheet are laminated and fired, so as to emit decomposition gas evenly from the binder or the like.

When the electrode support substrate of the present invention is used as a member for a solid electrolyte type fuel cell, an anodic electrode and a thin electrolyte film are formed on a single surface of the substrate. The method for forming the electrode or the thin electrolyte film is not particularly limited. The following can be appropriately used: a gas phase method, such as plasma spraying such as VSP, flame spraying, PVD (physical vapor deposition), magnetron sputtering, or electron beam PVD; or a wet method such as screen printing, sol-gel process, or slurry coating. The thickness of the anodic electrode is usually from 3 to 300 μm, preferably from 5 to 100 μm, and the thickness of the electrolyte layer is usually from 3 to 100 μm, preferably from 5 to 30 μm.

EXAMPLES

The following describes the present invention more specifically, giving working examples and comparative examples. However, the present invention is not basically limited by the following working examples, and may be carried out with appropriate modification within a scope suitable for the subject matters which have been described above and will be described below. All of them are included in the technical scope of the present invention.

Example 1

(Formation of Setters)

The following were mixed to produce a mixed powder as a starting material: 40% by mass of 8% by mole yttrium oxide stabilized zirconia powder (hereinafter referred to as the "8YSZ") wherein the average particle size thereof was 0.5 μm and the particle size of the 90% volume thereof was 1.2 μm; and 60% by mass of nickel oxide powder obtained by decomposing nickel carbonate powder thermally wherein the average particle size was 4.5 μm and the particle size of the 90% volume was 8 μm.

To 100 parts by mass of this mixed powder were added 12 parts by mass of an acrylic binder made of a copolymer obtained by use of 79.5% by mass of isobutyl methacrylate, 20% by mass of 2-ethylhexyl methacrylate and 0.5% by mass of methacrylic acid as monomer units, 40 parts by mass of toluene and ethyl acetate (ratio by mass: 2/1) as solvents, and 2 parts by mass of dibutyl phthalate as a plasticizer. The mixture was kneaded in a ball mill and then defoamed, and the viscosity thereof was adjusted, thereby yielding a slurry of 40 poise viscosity.

This slurry was fashioned into a sheet form by a doctor blade method, thereby forming green sheets, for setters, having a thickness of about 0.5 mm. This was cut into a given size. Subsequently, the resultants were put on a shelf board made of alumina and having a thickness of 20 mm, and fired at 1400° C. for 5 hours to yield porous setters 17 cm square and about 0.4 mm thick, the porosity thereof being 15%.

(Formation of Electrode Support Substrate)

(1) Formation of Green Sheet for Electrode Support Substrate

Commercially available 3% by mole yttria-stabilized zirconia powder (trade name "HSY-3.0", manufactured by Daichi Kigenso Kagaku Kogyo Co., Ltd., particle size construction: particle size of the 50% by volume=0.41 μm; and particle size of the 90% by volume=1.4 μm) (hereinafter referred to as the "3YSZ") was pre-fired at 1200° C. under the atmospheric of air for 3 hours. The following were put into a ball mill wherein alumina balls of 15 mm diameter were put: 20 parts by mass of the pre-fired powder (particle size construction: particle size of the 50% by volume=14 μm; and particle size of the 90% by volume=29 μm), 20 parts by mass of the above-mentioned zirconia powder not pre-fired, 60 parts by mass of nickel oxide powder (manufactured by Kishida Chemical Co., Ltd., particle size construction: particle size of the 50% by volume=0.6 μm; and particle size of the 90% by volume=2.7 μm), 10 parts by mass of corn starch (manufactured by Kanto Chemical Co., Inc.), 15 parts by mass of a methacrylic acid based copolymer (molecular weight: 30,000, glass transition temperature: −8° C.) as a binder, 2 parts by mass of dibutyl phthalate as a plasticizer, and 50 parts by mass of a mixed solvent of toluene and isopropyl alcohol (ratio by mass: 3/2) as a dispersing medium. The mixture was kneaded at about 60 rpm for 20 hours to prepare a slurry.

The particle size distribution of the resultant slurry was measured with a laser diffraction manner particle size distribution meter (trade name "SALD-1100", manufactured by Shimadzu Corp.), and the resultant frequency graph of the particle size distribution was observed. As a result, two peaks were observed in a section of 0.2 to 0.3 μm and a section of 4 to 5 μm, and the content ratio of fine particles in the range of 0.2 to 2 μm and coarse particles in the range of 3 to 50 μm was 82/18.

This slurry was put into a pressure-reducing defoaming machine, concentrated and defoamed to adjust the viscosity into 50 poise (25° C.). Anchor-shaped stirring fans immersed in the slurry were rotated at a rotating speed of 10 rpm for 24 hours, and finally the slurry was passed through a 200-mesh filter. The resultant was applied onto a polyethylene terephthalate (PET) film by a doctor blade method. At this time, a gap based on a blade was adjusted to form a green sheet having a thickness of about 0.59 mm.

(2) Punching and Firing of Green Sheet for Electrode Support Substrate

The green sheet obtained as described above was punched into a piece 15 cm square by the method as illustrated in FIGS. 8 to 11 using a punching blade (manufactured by Nakayama Shiki Zairyo Co., Ltd.) having a wave-form blade edge (in the form of the teeth of a saw as illustrated in FIGS. 5 to 7) and having blade edge angles $\alpha_1$ and $\alpha_2$ of 60° and 45°, respectively, blade edge angles $\theta_1$ and $\theta_2$ of 15° and 30°, respectively, a blade width t of 0.7 mm, a blade height h of 1 mm, and a pitch p of 1.1 mm.

The upper and lower faces of the punched substrate green sheet were sandwiched between the setters produced as described above so as not to force out the circumferential edge of the green sheet therefrom. Then the resultant was put onto a shelf board (trade name: "Dialight DC-M", manufactured by Tokai Konetsu Kogyo Co., Ltd.) having a thickness of 20 mm and fired at 1300° C. for 3 hours to yield an electrode support substrate about 12.5 cm square and about 0.5 mm thick.

Example 2

In the item "(1) Formation of green sheet for electrode support substrate" in Example 1, a slurry having no adjusted viscosity, obtained by treatment with a ball mill in the same way as in Example 1, and a slurry having a viscosity adjusted to 50 poise with the pressure-reducing defoaming machine were prepared. The slurry having no adjusted viscosity was added to the slurry having the adjusted viscosity. At this time, the addition was performed to make the total mass of the 3YSZ powder and the nickel oxide powder in the slurry having the adjusted viscosity equal to the total mass of the 3YSZ powder and the nickel oxide powder in the slurry having no adjusted viscosity.

Next, the viscosity of the mixed slurry was adjusted to 50 poise (25° C.) by pressure-reducing defoaming in the same way. The slurry was kept at room temperature while stirring fans in the slurry were rotated at a rotating speed of 12 rpm for 20 hours. The resultant green-sheet-producing slurry was used and fashioned into a sheet form. Thus, a green sheet having a thickness of about 0.59 mm was yielded.

Subsequently, in the same way as in Example 1, punching and firing were performed to yield an electrode support substrate about 12.5 cm square and about 0.5 mm thick.

Example 3

In the item "(1) Formation of green sheet for electrode support substrate" in Example 1, the viscosity of the slurry was adjusted to 60 poise by pressure-reducing defoaming. The slurry was kept at room temperature while the stirring fans were rotated at a rotating speed of 18 rpm for 30 hours. Subsequently, a gap based on the doctor blade was adjusted to form a green sheet having a thickness of 0.35 mm. In the very same way as in Example 1 except the above, an electrode support substrate about 12.5 cm square and about 0.3 mm thick was yielded.

Example 4

In the item "(1) Formation of green sheet for electrode support substrate" in Example 1, 10 parts by mass of corn starch (manufactured by Kanto Chemical Co., Inc.), 15 parts by mass of a binder made of methacrylic copolymer and 2 parts by mass of dibutyl phthalate as a plasticizer, the latter two of which were the same as in Example 1, were used for 15 parts by mass of pre-fired powder (particle size concentration: diameter of the 50% volume=20 μm; and diameter of the 90% volume=41 μm) obtained by pre-firing 8YSZ powder (particle size concentration: diameter of the 50% volume=0.5 μm; and diameter of the 90% volume=1.2 μm) at 1200° C. under the atmosphere of air for 3 hours, and 15 parts by mass of the above-mentioned powder not pre-fired, and 70 parts by mass of nickel oxide (manufactured by Seido Chemical Industry Co., Ltd., particle size concentration: diameter of the 50% volume=0.8 μm; and diameter of the 90% volume=2.1 μm). In the same way as in Example 1 except the above, a green sheet for a substrate was formed, and subsequently punching and firing were performed in the same way to yield an electrode support substrate about 12.5 cm square and about 0.5 mm thick.

Example 5

In the item "(1) Formation of green sheet for electrode support substrate" in Example 1, 10 parts by mass of corn starch (manufactured by Kanto Chemical Co., Inc.), 15 parts by mass of a binder made of methacrylic copolymer and 2 parts by mass of dibutyl phthalate as a plasticizer, the latter two of which were the same as in Example 1, were used for 20 parts by mass of pre-fired powder obtained by pre-firing commercially available 3YSZ powder (ditto) at 1200° C. under the atmosphere of air for 3 hours, 10 parts by mass of the above-mentioned powder not pre-fired, and 70 parts by mass of nickel oxide (manufactured by Kishida Chemical Co., Ltd.). In the same way as in Example 1 except the above, a green sheet for a substrate was formed, and subsequently punching and firing were performed in the same way to yield an electrode support substrate about 12.5 cm square and about 0.5 mm thick.

Example 6

In the item "(1) Formation of green sheet for electrode support substrate" in Example 1, 20 parts by mass of corn starch (manufactured by Kanto Chemical Co., Inc.), 15 parts by mass of a binder made of methacrylic copolymer and 2 parts by mass of dibutyl phthalate as a plasticizer, the latter two of which were the same as in Example 1, were used for 15 parts by mass of pre-fired powder obtained by pre-firing commercially available 3YSZ powder (ditto) at 1200° C. under the atmosphere of air for 3 hours, and 15 parts by mass of the above-mentioned powder not pre-fired, and 70 parts by mass of nickel oxide (manufactured by Seido Chemical Industry Co., Ltd.). In the same way as in Example 1 except the above, a green sheet for a substrate was formed, and subsequently punching and firing were performed in the same way to yield an electrode support substrate about 12.5 cm square and about 0.5 mm thick.

Comparative Example 1

In Example 1, the viscosity was adjusted to 50 poise (25° C.), and immediately after this the slurry was passed through a 200-mesh filter without keeping the slurry at room temperature while stirring the slurry. Subsequently, the slurry was applied onto a PET film by a doctor blade method so as to form a green sheet about 0.59 mm thick similarly. Furthermore, in the same way as in Example 1, an electrode support substrate about 12.5 cm square and about 0.5 mm thick was produced.

Comparative Example 2

In Example 1, the viscosity was adjusted to 120 poise (25° C.), and subsequently stirring fans were immersed into the slurry. The stirring fans in the slurry were rotated at a rotating speed of 10 rpm for 10 hours. Thereafter, the slurry was passed through a 200-mesh filter and then the slurry was applied onto a PET film by a doctor blade method so as to form a green sheet about 0.59 mm thick similarly. Furthermore, in the same way as in Example 1, an electrode support substrate about 12.5 cm square and about 0.5 mm thick was produced.

Comparative Example 3

In the item "(1) Formation of green sheet for electrode support substrate" in Example 1, the same materials were used except that the 1200° C. pre-fired powder made of the commercially available 3YSZ powder (ditto) was not used and 40 parts by mass of the 3YSZ powder (ditto) were used. The materials were put into a ball mill in which zirconia balls of 5 mm diameter were charged, and kneaded at about 50 rpm for 3 hours to prepare a slurry. In the same way as in the item 1) of Example 1 except the above, a green sheet of about 0.59 mm thickness was formed. Furthermore, in the same way as in Example 1, an electrode support substrate about 12.5 cm square and about 0.5 mm thick was formed.

Comparative Example 4

In the item "(1) Formation of green sheet for electrode support substrate" in Example 1, the same materials were used except that the 3YSZ powder (ditto) was not used and the following were used: 40 parts by mass of 3YSZ powder pre-fired at 1200° C. for 3 hours and 60 parts by mass of powder obtained by pre-firing nickel oxide powder (manufactured by Kishida Chemical Co., Ltd.) at 1100° C. in the atmosphere of air for 3 hours (particle size concentration: diameter of the 50% volume=17 μm; and diameter of the 90% volume=30 μm). The materials were put into a ball mill in which alumina balls of 20 mm diameter were charged, and kneaded at about 40 rpm for 10 hours to prepare a slurry. In the same way as in the item 1) of Example 1 except the above, a green sheet of about 0.59 mm thickness was formed. Furthermore, in the same way as in Example 1, an electrode support substrate about 12.5 cm square and about 0.5 mm thick was formed.

Comparative Example 5

In Comparative Example 1, the conditions for ripening the slurry was changed as follows: 2 rpm×2 hours. In the item "(2) Punching of Green Sheet for Substrate", a single edge blade (manufactured by Nakayama Shiki Zairyo Co., Ltd.) having a straight blade edge having a thickness t of 0.7 mm and an blade edge angle $\alpha_2$ of 45° was used to punch the sheet into a piece 15 cm square. In the very same way except the above, punching and firing were performed to form an electrode support substrate.

Comparative Example 6

In the item "(1) Formation of green sheet for electrode support substrate" in Comparative Example 1, 25 parts by mass of the binder made of the methacrylic acid based copolymer were used and further the conditions for ripening the slurry was changed as follows: 2 rpm×54 hours. Additionally, in the item 2) Firing of Green Sheet for Substrate therein, the electrode-substrate-forming green sheet was fired without putting any setter thereon and further the following was used as the setter for underlay: a setter wherein about ten adhering particles having a diameter of about 0.5 to 2 mm were observed per 100 cm$^2$. In the same way as the above-mentioned example except the above, an electrode support substrate was formed.

Performance Tests

Each of the electrode support substrates obtained in Examples 1 to 6 and Comparative Examples 1 to 6 was used to make the following performance evaluating tests. The results are shown in Tables 1 to 6.

(1) Gas Permeable Test

The electrode support substrate about 12.5 cm square and about 0.5 mm thick, which was obtained as described above, was cut into 16 pieces 3 cm square with a diamond cutter fitted to a ceramic grinder (manufactured by Marutoh Co., Ltd.). These were used as permeability testing pieces.

Any one of the testing pieces was set to a permeability testing machine (trade name: "KES-F8-AP1", manufactured by Kato Tech Co., Ltd.), to which an assistant member for holding a sample was fitted. This testing machine is a machine which has a mechanism wherein a constant flow rate of air is sent to the test piece by piston movement of a plunger and a cylinder to emit the air into the atmosphere or absorb air therefrom, and which is capable of measuring the pressure loss based on the sample with a differential pressure semiconductor gauge within 10 seconds per cycle and showing the gas permeation resistance (the reciprocal number of the gas permeability) of the sample directly with a digital panel meter. The size of the sample piece was 3 cm square, and both ends thereof were necessary by 0.5 mm for holding the sample piece. Therefore, the effective area thereof was 2 cm square (area: 4 cm$^2$). The outline of the machine is illustrated in FIG. 12 (in this figure, S represents the sample; 11, a compressor; 12, a flow rate meter; and 13, a differential pressure meter).

About each of the 16 sample pieces, the gas permeability thereof was measured. The average value and the standard deviation were obtained, and further the variation coefficient was obtained.

(2) Measurement of Porosity

The porosities of the electrode support substrate obtained as described above were measured with an automatic porosimeter (trade name: "Autopore III9240", manufactured by Shimadzu Corp.).

(3) Surface Roughness

A laser optical manner non-contact three-dimensional shape measuring device (trade name: "Micro-focus Expert UBM-14 model", manufactured by UBM Co.) was used to measure the maximum roughness depths (Rmax) of the front and rear faces (the side contacting the PET surface when the green sheet was formed is referred as the front side) of each of the electrode support substrates at a pitch of 0.1 mm.

Simultaneously, burrs on the circumferential edge of each of the electrode support substrates, and projections and undulations on the surface were measured.

(4) Load Test

Each of the sample substrates was arranged on an alumina underlying-plate in the state that the substrate was sandwiched between two alumina plates (trade name: "SSA-S1", manufactured by Nikkato Co., Ltd.), the surfaces of which were smooth and had kept parallelism, and then a load of 0.2 kg/cm$^2$ was applied onto the entire surface of the substrate. In this state, the temperature of the substrate was raised from room temperature to 1000° C. over 10 hours, and kept at 1000° C. for 1 hour, and then dropped to room temperature. This operation was repeated ten times to obtain the generation frequency of cracking or breaking. It was judged with the naked eye whether or the cracking or breaking was generated.

(5) Observation of Cell Printed Interface

The states of the interfaces between each of the electrode support substrates and an anodic electrode and between each of the electrode support substrates and an electrolyte layer were observed from an SEM photograph thereof.

(Formation of Cell)

(a) Preparation of Paste

To 100 parts by mass of 10% by mole scandia- and 1% by mole ceria-stabilized zirconia powder (manufactured by Daichi Kigenso Kagaku Kogyo Co., Ltd.) were added 350 parts by mass of turpentine oil and 2 parts by mass of ethylcellulose as a binder. Then, the mixture was kneaded in a planetary mill for 2 hours to yield a slurry. The slurry was used as an electrolyte paste.

To 50 parts by mass of 3YSZ powder (ditto) and 50 parts by mass of nickel oxide (manufactured by Kishida Chemical Co., Ltd.) were added 350 parts by mass of turpentine oil and 2 parts by mass of ethylcellulose as a binder. Then, the mixture was kneaded in a planetary mill for 2 hours to yield a slurry. The slurry was used as an anode paste.

To 100 parts by mass of $La_{0.8}Sr_{0.2}MnO_3$ powder (manufactured by Seimi Chemical Co., Ltd.) were added 350 parts by mass of turpentine oil and 2 parts by mass of ethylcellulose as a binder. Then, the mixture was kneaded in a planetary mill for 2 hours to yield a slurry. The slurry was used as a cathode paste.

(b) Formation of Cell

Next, the anode paste was printed onto one surface of the above-mentioned electrode support substrate by screen printing. The resultant was dried at 100° C. for 1 hour and fired at 1350° C. for 2 hours to form an anode layer on the electrode support substrate, thereby forming an anode-layer-attached electrode support substrate (AS-A).

The electrolyte paste was printed on the anode layer of the anode-layer-attached electrode support substrate (AS-A) by screen printing. The resultant was dried at 100° C. for 1 hour and fired at 1350° C. for 2 hours to form a half cell wherein the anode layer and an electrolyte layer were formed on the electrode support substrate (AS-A-E).

Finally, the cathode paste was applied onto the electrolyte layer of this half cell by screen printing. The resultant was dried at 100° C. for 1 hour and fired at 1300° C. for 2 hours to form a cell wherein the anode layer, the electrolyte layer and a cathode layer were formed on the electrode support substrate (AS-A-E-C). The electrode area of the cell was about 121 cm².

(c) An electrolyte layer, an anode layer, and a cathode layer were formed on the electrode support substrate about 12.5 cm square and about 0.5 mm thick, obtained in each of the Examples and the Comparative Examples, by screen printing in accordance with the method described in the item (Formation of cell), so as to produce an anode-layer-attached electrode support substrate (AS-A) and a half cell (AS-A-E). The surface of each thereof was observed with the naked eye. Further the state of the printed interface was observed from an SEM photograph thereof. In this way, the state of the interface between the electrode support substrate and the anode layer, the state of the interface between the anode layer and the electrolyte layer, and the state of the electrolyte layer were examined.

(6) Power Generation Test

Furthermore, in a single cell power generation test device using the cell (AS-A-E-C) produced in accordance with the method described in the item (Formation of cell), humidified hydrogen and air were used as a fuel and an oxidizer, respectively, to make a power generation test at a power generation temperature of 800° C. for 24 hours. The highest power density at the initial of the test and the highest power density after 24 hours from the start of the test were obtained so as to calculate the decreasing rate of the highest power.

The results are shown in Tables 1 to 6

TABLE 1

|  | Example 1 | Example 2 | Example 3 |
|---|---|---|---|
| Composition | NiO/3YSZ + pre-sintered 3YSZ/starch 60/20 + 20/10 | NiO/3YSZ + pre-sintered 3YSZ/starch 60/20 + 20/10 | NiO/3YSZ + pre-sintered 3YSZ/starch 60/20 + 20/10 |
| Peak sections in slurry particle size distribution | 0.2 to 0.3 μm and 4 to 5 μm | 0.2 to 0.3 μm and 4 to 5 μm | 0.2 to 0.3 μm and 4 to 5 μm |
| Content ratio of fine particles to coarse particles | 82/18 | 82/18 | 82/18 |
| Slurry viscosity (poise) | 50 | 50 | 60 |
| Conditions for keeping slurry at room temperature | 10 rpm × 24 hours | 12 rpm × 20 hours | 18 rpm × 30 hours |
| Green sheet thickness (mm) | 0.59 | 0.59 | 0.35 |
| Punching die | Wave form | Wave form | Wave form |
| Support substrate thickness (mm) | 0.5 | 0.5 | 0.3 |
| Porosity (%) | 25 | 23 | 27 |
| Burr height/substrate thickness | 0.30 | 0.27 | 0.34 |
| Undulation height/substrate thickness | 0.13 | 0.11 | 0.17 |
| Projection height/substrate thickness | 0.15 | 0.12 | 0.17 |

TABLE 2

|  | Example 4 | Example 5 | Example 6 |
|---|---|---|---|
| Composition | NiO/8YSZ + pre-sintered 8YSZ/starch 70/15 + 15/10 | NiO/3YSZ + pre-sintered 3YSZ/starch 70/20 + 10/10 | NiO/3YSZ + pre-sintered 3YSZ/starch 70/15 + 15/20 |
| Peak sections in slurry particle size distribution | 0.2 to 0.3 μm and 5 to 6 μm | 0.2 to 0.3 μm and 4 to 5 μm | 0.2 to 0.3 μm and 4 to 5 μm |
| Content ratio of fine particles to coarse particles | 86/14 | 82/18 | Dec-88 |
| Slurry viscosity (poise) | 50 | 70 | 50 |
| Conditions for keeping slurry at room temperature | 10 rpm × 24 hours | 10 rpm × 24 hours | 10 rpm × 24 hours |
| Green sheet thickness (mm) | 0.59 | 0.59 | 0.59 |
| Punching die | Wave form | Wave form | Wave form |
| Support substrate thickness (mm) | 0.5 | 0.5 | 0.5 |
| Porosity (%) | 28 | 28 | 32 |
| Burr height/substrate thickness | 0.41 | 0.32 | 0.36 |
| Undulation height/substrate thickness | 0.11 | 0.15 | 0.13 |
| Projection height/substrate thickness | 0.12 | 0.17 | 0.14 |

TABLE 3

|  | Comparative Example 1 | Comparative Example 2 | Comparative Example 3 |
|---|---|---|---|
| Composition | NiO/3YSZ + pre-sintered 3YSZ/starch 60/20 + 20/10 | NiO/3YSZ + pre-sintered 3YSZ/starch 60/20 + 20/10 | NiO/3YSZ/starch 60/40/10 |
| Peak sections in slurry particle size distribution | 0.2 to 0.3 μm and 4 to 5 μm | 0.2 to 0.3 μm and 4 to 5 μm | Only 0.2 to 0.3 μm |
| Content ratio of fine particles to coarse particles | 82/18 | 82/18 | — |
| Slurry viscosity (poise) | 50 | 120 | 40 |
| Conditions for keeping slurry at room temperature | Nothing | 10 rpm × 10 hours | 50 rpm × 3 hours |
| Green sheet thickness (mm) | 0.59 | 0.59 | 0.59 |
| Punching die | Wave form | Wave form | Wave form |
| Support substrate thickness (mm) | 0.5 | 0.5 | 0.5 |
| Porosity (%) | 25 | 29 | 28 |
| Burr height/substrate thickness | 0.33 | 0.37 | 0.39 |
| Undulation height/substrate thickness | 0.14 | 0.19 | 0.21 |
| Projection height/substrate thickness | 0.15 | 0.26 | 0.12 |

TABLE 4

|  | Comparative Example 4 | Comparative Example 5 | Comparative Example 6 |
|---|---|---|---|
| Composition | Pre-sintered NiO/pre-sintered 3YSZ/starch 60/40/10 | NiO/3YSZ + pre-sintered 3YSZ/starch 60/20 + 20/10 | NiO/3YSZ + pre-sintered 3YSZ/starch 60/20 + 20/10 |
| Peak sections in slurry particle size distribution | Only 7 to 8 μm | 0.2 to 0.3 μm and 4 to 5 μm | 0.2 to 0.3 μm and 4 to 5 μm |
| Content ratio of fine particles to coarse particles | — | 82/18 | 82/18 |
| Slurry viscosity (poise) | 80 | 50 | 50 |
| Conditions for keeping slurry at room temperature | 40 rpm × 10 hours | 2 rpm × 2 hours | 2 rpm × 54 hours |
| Green sheet thickness (mm) | 0.59 | 0.59 | 0.59 |
| Punching die | Wave form | Linear | Wave form |
| Support substrate thickness (mm) | 0.5 | 0.5 | 0.5 |
| Porosity (%) | 37 | 26 | 26 |
| Burr height/substrate thickness | 0.24 | 0.68 | 0.42 |
| Undulation height/substrate thickness | 0.14 | 0.31 | 0.35 |
| Projection height/substrate thickness | 0.19 | 0.28 | 0.38 |

TABLE 5

|  | Example 1 | Example 2 | Example 3 | Example 4 | Example 5 | Example 6 |
|---|---|---|---|---|---|---|
| Crack generation frequency (%/in 20 sheets) | 0 | 0 | 0 | 0 | 5 | 0 |
| Surface roughness (μm) | | | | | | |
| Front face Rmax | 4.15 | 2.89 | 3.74 | 18.13 | 5.57 | 3.11 |
| Rear face Rmax | 3.97 | 3.13 | 3.61 | 22.09 | 3.96 | 3.83 |
| Gas permeability test (mL/min·kPa) | | | | | | |
| Gas permeability maximum value | 33 | 28 | 62 | 41 | 30 | 30 |
| Gas permeability minimum value | 19 | 18 | 45 | 23 | 19 | 19 |
| Average value | 23 | 23 | 54 | 32 | 15 | 24 |

TABLE 5-continued

|  | Example 1 | Example 2 | Example 3 | Example 4 | Example 5 | Example 6 |
|---|---|---|---|---|---|---|
| Standard deviation | 2.1 | 1.7 | 8.3 | 3.7 | 1.9 | 2.5 |
| Variation coefficient | 9 | 7 | 15 | 12 | 13 | 10 |
| Anode formation |  |  |  |  |  |  |
| Interface between substrate and anode | Close adhesion | Close adhesion | Close adhesion | Close adhesion | Close adhesion | Close adhesion |
| Electrolyte formation |  |  |  |  |  |  |
| Interface between anode and electrolyte | Close adhesion | Close adhesion | Close adhesion | Close adhesion | Close adhesion | Close adhesion |
| State of electrolyte thickness | Substantially even | Substantially even | Substantially even | Substantially even | Substantially even | Substantially even |
| Power generation performance |  |  |  |  |  |  |
| Highest-power decreasing rate (%) | 8 | 6 | 7 | 11 | 14 | 9 |
| Crack after the test | Not generated | Not generated | Not generated | Not generated | Not generated | Not generated |

TABLE 6

|  | Comparative Example 1 | Comparative Example 2 | Comparative Example 3 | Comparative Example 4 | Comparative Example 5 | Comparative Example 6 |
|---|---|---|---|---|---|---|
| Crack generation frequency (%/in 20 sheets) | 0 | 5 | 10 | 45 | 26 | 36 |
| Surface roughness (μm) |  |  |  |  |  |  |
| Front face Rmax | 4.36 | 3.84 | 4.75 | 47.3 | 3.42 | 3.86 |
| Rear face Rmax | 4.19 | 4.33 | 4.96 | 45.8 | 3.06 | 4.11 |
| Gas permeability test (mL/min-kPa) |  |  |  |  |  |  |
| Gas permeability maximum value | 35 | 30 | 33 | 43 | 35 | 33 |
| Gas permeability minimum value | 12 | 9 | 15 | 17 | 14 | 13 |
| Average value | 20 | 21 | 21 | 24 | 23 | 19 |
| Standard deviation | 6.6 | 5.5 | 5.9 | 5.5 | 7.1 | 4.2 |
| Variation coefficient | 33 | 26 | 28 | 23 | 31 | 22 |
| Anode formation |  |  |  |  |  |  |
| Interface between substrate and anode | Close adhesion | Close adhesion | Exfoliation | Partial exfoliation | Close adhesion | Partial exfoliation |
| Electrolyte formation |  |  |  |  |  |  |
| Interface between anode and electrolyte | Close adhesion | Close adhesion | Close adhesion | Partial exfoliation | Close adhesion | Close adhesion |
| State of electrolyte thickness | Substantially even | Substantially even | Substantially even | Uneven | Substantially even | Substantially even |
| Power generation performance |  |  |  |  |  |  |
| Highest-power decreasing rate (%) | 35 | 23 | 28 | 31 | 18 | 20 |
| Crack after the test | Generated | Generated | Generated | Generated | Generated | Generated |

INDUSTRIAL APPLICABILITY

The present invention is constructed as described above, and comprises a ceramic sheet having appropriate porosity, thickness and surface area. In particular, the variation coefficient of measured values of the gas permeable amounts thereof is set into a given range and further the surface roughness measured with a laser optical manner three-dimensional shape measuring device is controlled, as the maximum roughness depth thereof, into a specific range, thereby making it possible to provide an electrode support substrate wherein a dense, even and highly-adhesive printed electrode can be formed while even and superior gas permeability/diffusibility can be ensured, the substrate having performances eminent for a solid oxide type fuel cell.

Furthermore, the height of burrs, and the height(s) of undulations and/or projections, which are measured with the same laser optical manner three-dimensional shape measuring device, are specified, thereby making it possible to provide an electrode support substrate for giving a high-performance fuel cell capable of suppressing cracking or braking based on local stress concentration when stacking-load is applied to the cell and capable of resisting thermal shock, thermal stress and others.

The invention claimed is:

1. A process for producing an electrode support substrate in sheet form for a solid oxide type fuel cell comprising:
    providing a slurry comprising a conductive component powder, a skeleton component powder, a pore-forming agent powder and a binder,
    wherein the slurry is defoamed under reduced pressure after milling to adjust the viscosity thereof to 40 to 100 poise (25° C.), and kept at room temperature while rotating stirring fans therein at a rotating speed of 5 to 30 rpm for 20 to 50 hours, and
    wherein a particle size distribution of the slurry has a peak in each of ranges of 0.2 to 2 μm and 3 to 50 μm, and a content ratio by mass of fine particles in the range of 0.2 to 2 μm to coarse particles in the range of 3 to 50 μm is in a range of 20/80 to 90/10;
    fashioning the slurry into a sheet by a doctor blade method to obtain a green sheet, wherein the green sheet is a precursor of the electrode support substrate;
    cutting the green sheet into a given shape; and
    then firing the green sheet having the given shape to produce the electrode support substrate.

2. The process according to claim 1, wherein the slurry comprises 5 to 30 parts by mass of the binder and 2 to 40 parts by mass of the pore-forming agent powder with respect to 100 parts by mass of the total of the conductive component powder and the skeleton component powder.

3. The process according to claim 1, wherein the green sheet is cut into the given shape by a punching blade having a waver-form blade edge.

4. The process according to claim 3, wherein the punching blade comprises angles $(\alpha_1)$, $(\alpha_2)$, $(\theta_1)$ and $(\theta_2)$,
    wherein the angles satisfy the following relationship:

$$\alpha_1 = 30 \text{ to } 120°, 20° \leq \alpha_2 = \theta_1 + \theta_2 \leq 70°, \text{ and } \theta_1 \leq \theta_2,$$
    and
    wherein $(\alpha_1)$ is an angle being viewed from a side face of the blade,
    $(\alpha_2)$ is a blade edge angle of a cross section of the blade,
    $(\theta_1)$ is an angle between a surface on a side of the sheet and a center line (x) passing through the blade edge, and
    $(\theta_2)$ is an angle between a surface thereof on a side of the rest of the sheet and a center line (x) passing through the blade edge.

5. An electrode support substrate for a solid oxide type fuel cell produced by the process according to claim 1,
    wherein the electrode support substrate comprises a ceramic sheet having a porosity of 20 to 50%, a thickness of 0.2 to 3 mm and a surface area of 50 cm$^2$ or more, and a variation coefficient of measured values of gas permeable amounts of any area of 4 cm$^2$ selected optionally from a whole of a surface area of the substrate is from 5 to 20%, wherein the values are measured by a method according to JIS K 6400 (1997).

6. The electrode support substrate according to claim 5, wherein a surface roughness thereof is 1.0 to 40 μm as the maximum roughness depth (Rmax), measured with a laser optical manner non-contact three-dimensional shape measuring device at a pitch of 0.1 mm.

7. The electrode support substrate according to claim 5, wherein a height of burrs of the electrode support substrate measured with a laser optical manner three-dimensional shape measuring device is ½ or less of the thickness of the sheet.

8. The electrode support substrate according to claim 5, wherein a largest height(s) of undulations and/or projections of the electrode support substrate measured with a laser optical manner three-dimensional shape measuring device is/are ⅓ or less of the thickness of the sheet.

9. The electrode support substrate according to claim 6, wherein a height of burrs of the electrode support substrate measured with a laser optical manner three-dimensional shape measuring device is ½ or less of the thickness of the sheet.

10. The electrode support substrate according to claim 6, wherein a largest height(s) of undulations and/or projections of the electrode support substrate measured with a laser optical maimer three-dimensional shape measuring device is/are ⅓ or less of the thickness of the sheet.

11. The electrode support substrate according to claim 7, wherein a largest height(s) of undulations and/or projections of the electrode support substrate measured with a laser optical manner three-dimensional shape measuring device is/are ⅓ or less of the thickness of the sheet.

12. The process according to claim 2, wherein the green sheet is cut into the given shape by a punching blade having a waver-form blade edge.

* * * * *